United States Patent
Kono

(10) Patent No.: US 9,630,344 B2
(45) Date of Patent: Apr. 25, 2017

(54) ELECTRODE PASTE PRODUCTION DEVICE AND ELECTRODE PASTE PRODUCTION METHOD

(71) Applicant: Takashi Kono, Okazaki (JP)

(72) Inventor: Takashi Kono, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 583 days.

(21) Appl. No.: 13/974,431

(22) Filed: Aug. 23, 2013

(65) Prior Publication Data

US 2014/0061547 A1   Mar. 6, 2014

(30) Foreign Application Priority Data

Sep. 6, 2012   (JP) ................. 2012-196307

(51) Int. Cl.
| | |
|---|---|
| *B29B 7/18* | (2006.01) |
| *B01F 7/00* | (2006.01) |
| *B01F 7/04* | (2006.01) |
| *B01F 7/08* | (2006.01) |
| *B01F 3/12* | (2006.01) |

(Continued)

(52) U.S. Cl.
CPC .............. *B29B 7/18* (2013.01); *B01F 3/1221* (2013.01); *B01F 7/0065* (2013.01); *B01F 7/042* (2013.01); *B01F 7/085* (2013.01); *H01M 4/04* (2013.01); *B01F 2015/0221* (2013.01); *Y02P 70/54* (2015.11)

(58) Field of Classification Search
CPC ........ B01F 7/0065; B01F 7/042; B01F 7/085; B29B 7/18

USPC ........................... 366/84, 85, 81, 82, 88, 89
See application file for complete search history.

(56) References Cited

U.S. PATENT DOCUMENTS 3,122,356 A * 2/1964 Erdmenger ......... B29C 47/6056
366/85
3,608,868 A * 9/1971 Koch ..................... B29B 7/483
366/82

(Continued)

FOREIGN PATENT DOCUMENTS

| CN | 1652373 A | 8/2005 |
|---|---|---|
| JP | A-5-96146 | 4/1993 |

(Continued)

OTHER PUBLICATIONS

Jun. 3, 2015 Office Action issued in Chinese Application No. 201310396077.0.

*Primary Examiner* — Tony G Soohoo
(74) *Attorney, Agent, or Firm* — Oliff PLC

(57) ABSTRACT

In production of electrode paste, powder and solvent are separately injected into a hollow exterior component, the powder and the solvent are transferred to a downstream side in a transfer direction by rotation of two rotary shafts supported by the exterior component in a state where the rotary shafts are located parallel to each other at a predetermined interval, a mixture is produced by mixing the powder and the solvent by rotation of the rotary shafts without applying a shearing force, which is higher than or equal to a predetermined shearing force, to the powder, and producing electrode paste by kneading the mixture through application of a shearing force, which is higher than the shearing force that is applied in the mixing step, to the mixture through rotation of the rotary shafts.

6 Claims, 19 Drawing Sheets

(51) Int. Cl.
*H01M 4/04* (2006.01)
*B01F 15/02* (2006.01)

(56) References Cited

U.S. PATENT DOCUMENTS

| | | | | |
|---|---|---|---|---|
| 4,040,607 A | * | 8/1977 | Ullrich | B29B 7/485 366/85 |
| 4,107,787 A | * | 8/1978 | Ocker | B29C 47/38 159/2.2 |
| 4,352,568 A | * | 10/1982 | Lohr | B01F 7/105 366/297 |
| 4,423,960 A | * | 1/1984 | Anders | B29C 47/38 366/75 |
| 4,474,473 A | * | 10/1984 | Higuchi | B29B 7/007 366/139 |
| 4,534,652 A | * | 8/1985 | Stade | B29B 7/483 366/301 |
| 4,535,652 A | * | 8/1985 | Nishikawa | F16H 61/143 192/3.3 |
| 4,752,135 A | * | 6/1988 | Loomans | B29B 7/482 366/297 |
| 4,824,256 A | * | 4/1989 | Haring | B01F 7/105 366/301 |
| 4,846,054 A | * | 7/1989 | Mange | C11B 1/08 100/117 |
| 4,875,847 A | * | 10/1989 | Wenger | B30B 11/243 264/211.21 |
| 5,114,732 A | | 5/1992 | Major et al. | |
| 5,267,788 A | * | 12/1993 | Rockstedt | B29B 7/482 366/301 |
| 5,358,693 A | * | 10/1994 | Brinkmann | B29B 7/48 366/66 |
| 5,499,870 A | * | 3/1996 | Rockstedt | B29C 47/0825 366/300 |
| 5,516,205 A | * | 5/1996 | Oda | B29B 7/486 366/300 |
| 5,593,227 A | * | 1/1997 | Scheuring | B29B 7/483 366/82 |
| 5,836,682 A | * | 11/1998 | Blach | B29C 47/767 366/297 |
| 5,851,065 A | * | 12/1998 | Ikeda | B29B 17/00 366/76.5 |
| 5,855,432 A | * | 1/1999 | Inoue | B29B 7/465 366/322 |
| 6,048,088 A | * | 4/2000 | Haring | B29C 47/0825 366/85 |
| 6,170,975 B1 | * | 1/2001 | Andersen | B01F 7/105 366/82 |
| 6,338,867 B1 | * | 1/2002 | Lihotzky-Vaupel | A21C 1/065 426/498 |
| 6,447,156 B2 | * | 9/2002 | Maris | B29C 47/38 366/82 |
| 6,783,270 B1 | * | 8/2004 | Padmanabhan | B29C 47/0861 366/82 |
| 8,087,815 B2 | * | 1/2012 | Fukutani | B29B 7/483 366/301 |
| 8,770,824 B2 | * | 7/2014 | Nogata | B29B 7/482 366/76.6 |
| 2002/0093118 A1 | * | 7/2002 | Inoue | B29B 7/481 264/211.23 |
| 2003/0128624 A1 | | 7/2003 | Inoue et al. | |
| 2005/0041521 A1 | * | 2/2005 | Herter | B29C 47/6056 366/82 |
| 2009/0213681 A1 | * | 8/2009 | Ek | B29B 7/465 366/76.1 |
| 2010/0091603 A1 | * | 4/2010 | Yamane | B29B 7/482 366/85 |
| 2010/0296361 A1 | * | 11/2010 | Brown | B29C 47/0019 366/84 |
| 2011/0096617 A1 | * | 4/2011 | Bierdel | B29C 47/0854 366/84 |
| 2011/0184089 A1 | * | 7/2011 | Bierdel | B29B 7/481 523/348 |
| 2012/0182823 A1 | * | 7/2012 | Burkhardt | B29B 7/483 366/85 |
| 2014/0061547 A1 | * | 3/2014 | Kono | B29B 7/18 252/500 |

FOREIGN PATENT DOCUMENTS

| | | |
|---|---|---|
| JP | A-11-147219 | 6/1999 |
| JP | A-2003-245534 | 9/2003 |
| JP | A-2005-222772 | 8/2005 |
| JP | A-2005-279374 | 10/2005 |
| JP | A-2011-83703 | 4/2011 |
| JP | A-2011-235258 | 11/2011 |
| WO | WO 95/19052 A1 | 7/1995 |

* cited by examiner

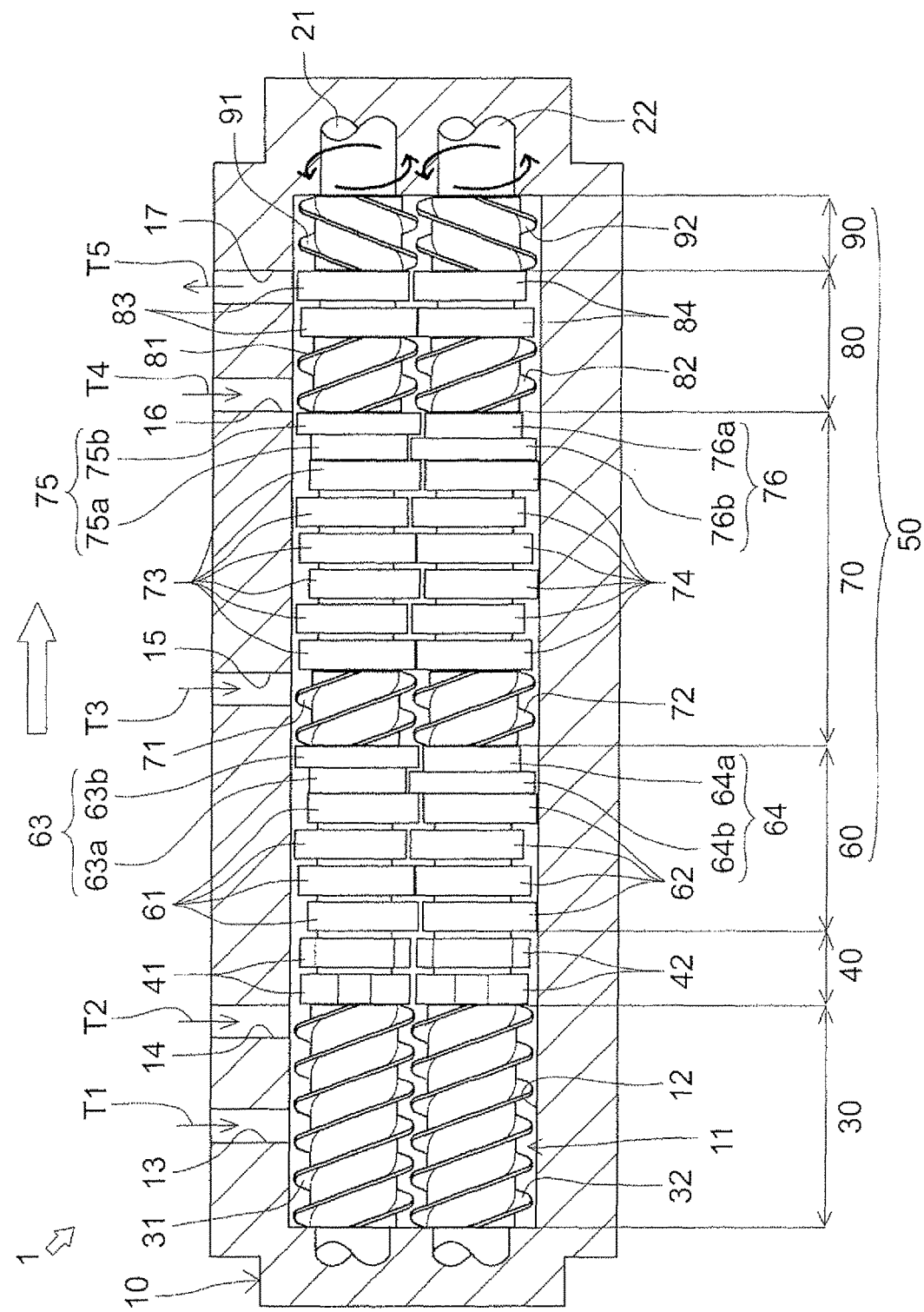

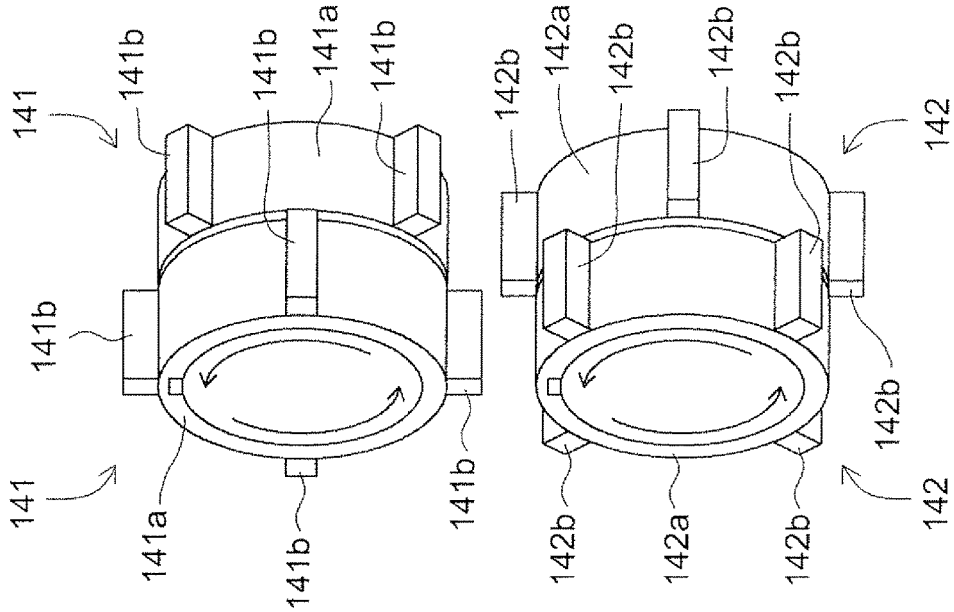
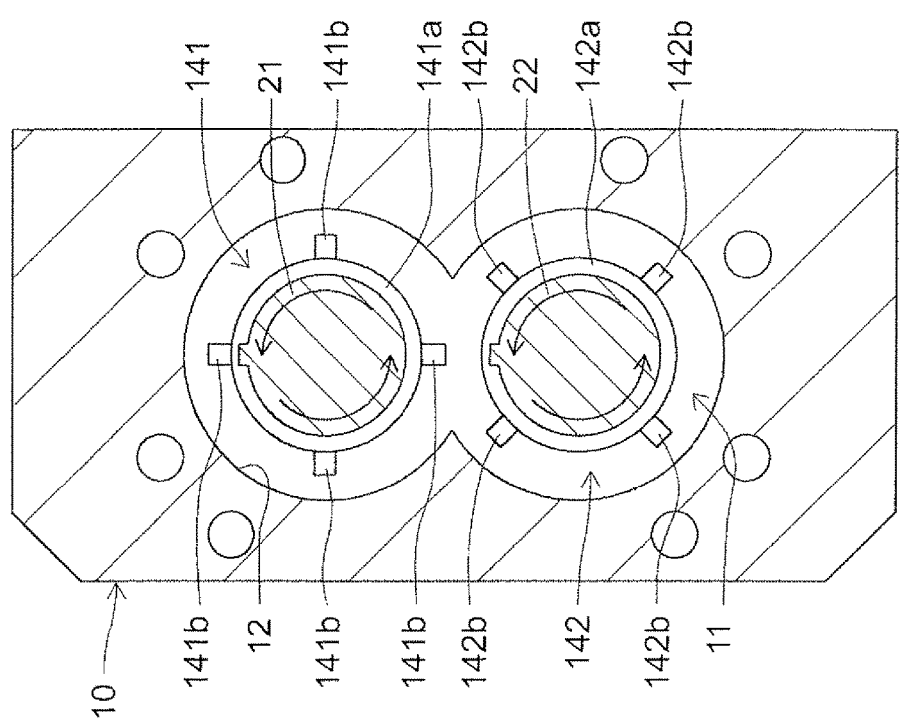

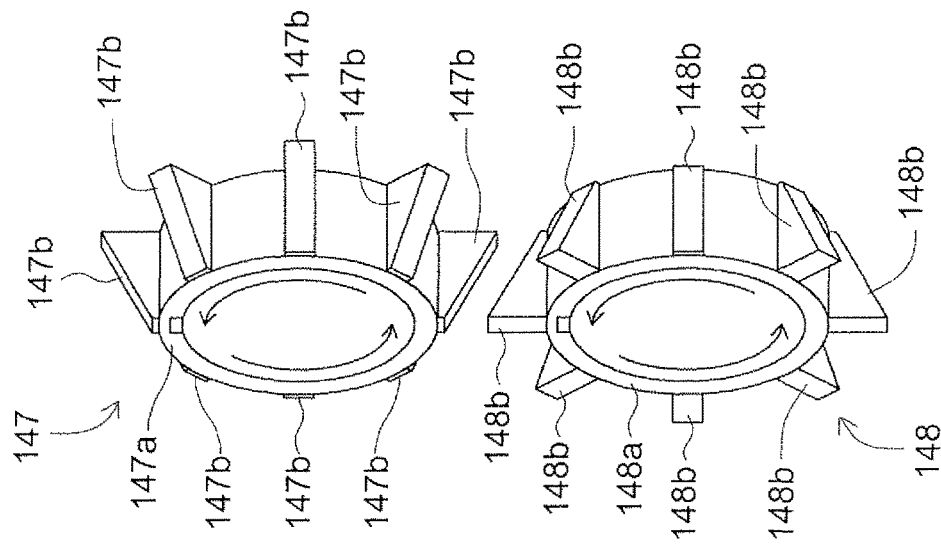
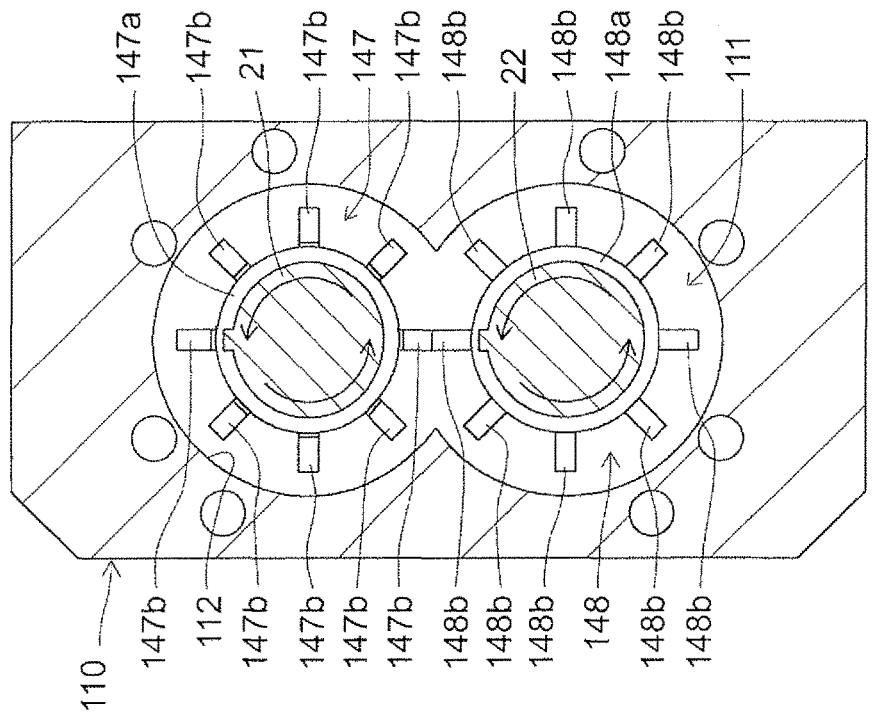

FIG. 13

|  | EXISTING DEVICE | FIRST EMBODIMENT | SECOND EMBODIMENT |
|---|---|---|---|
| AVERAGE RESIDENCE TIME (min) | 6 | 6 | 6 |
| ROTATION SPEED (rpm) | 600 | 600 | 600 |
| ROUGH MIXING ZONE | NOT PROVIDED | SIX PAIRS OF 5mm PADDLES | TWO PAIRS OF TWISTED IMPELLERS |
| STIFFENING ZONE | SIX PAIRS OF 1mm PADDLES | | FOUR PAIRS OF 1mm PADDLES |
| PARTICLE SIZE DISTRIBUTION D50 ($\mu$m) | 9.3 | 10.0 | 9.9 |
| VISCOSITY (mPa·s) | 600 | 1100 | 700 |

FIG. 15

| | EXISTING DEVICE | THIRD EMBODIMENT | | | |
|---|---|---|---|---|---|
| | | CASE 1 | CASE 2 | CASE 3 | CASE 4 |
| AVERAGE RESIDENCE TIME (min) | 6 | 6 | 6 | 6 | 6 |
| ROTATION SPEED (rpm) | 600 | 600 | 600 | 600 | 600 |
| ACCUMULATED NUMBER OF REVOLUTIONS IN ROUGH MIXING ZONE | 0 | 1800 | 900 | 600 | 300 |
| ROUGH MIXING ZONE | NOT PROVIDED | SIX PAIRS OF 5mm PADDLES | THREE PAIRS OF 5mm PADDLES | TWO PAIRS OF 5mm PADDLES | ONE PAIR OF 5mm PADDLES |
| STIFFENING ZONE | SIX PAIRS OF 1mm PADDLES | | THREE PAIRS OF 1mm PADDLES | FOUR PAIRS OF 1mm PADDLES | FIVE PAIRS OF 1mm PADDLES |
| PARTICLE SIZE DISTRIBUTION D50 (μm) | 9.3 | 10.0 | 9.9 | 9.8 | 9.5 |

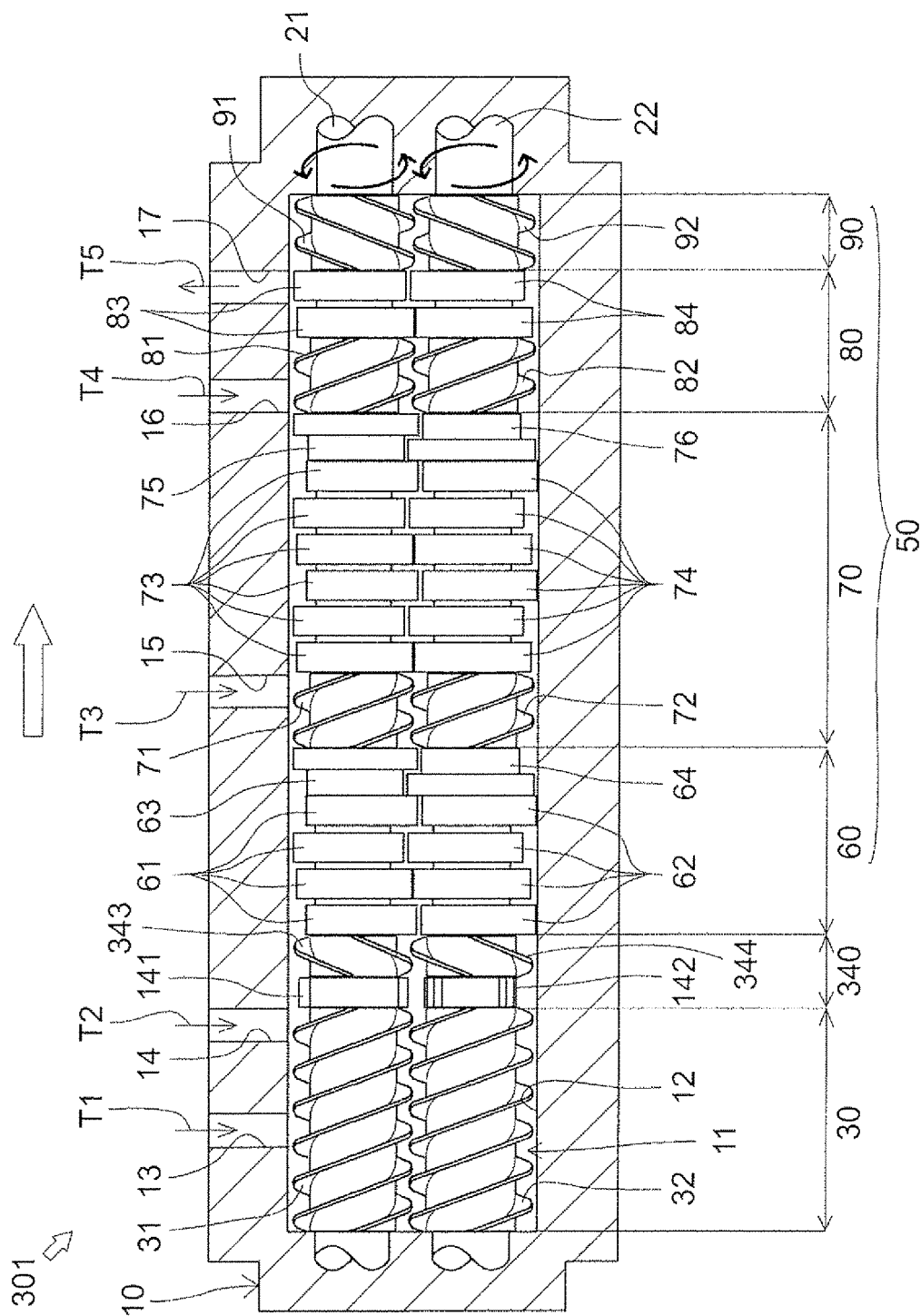

FIG. 17

|  | EXISTING DEVICE | FOURTH EMBODIMENT |
|---|---|---|
| AVERAGE RESIDENCE TIME (min) | 6 | 6 |
| ROTATION SPEED (rpm) | 600 | 600 |
| ROUGH MIXING ZONE | NOT PROVIDED | UPSTREAM SIDE: ONE PAIR OF IMPELLERS<br>DOWNSTREAM SIDE: RETURN SCREWS |
| STIFFENING ZONE | SIX PAIRS OF 1mm PADDLES | FOUR PAIRS OF 1mm PADDLES |
| PARTICLE SIZE DISTRIBUTION D50 ($\mu$m) | 9.3 | 10.0 |

ELECTRODE PASTE PRODUCTION DEVICE AND ELECTRODE PASTE PRODUCTION METHOD

INCORPORATION BY REFERENCE

The disclosure of Japanese Patent Application No. 2012-196307 filed on Sep. 6, 2012 including the specification, drawings and abstract is incorporated herein by reference in its entirety.

BACKGROUND OF THE INVENTION

1. Field of the Invention

The invention relates to an electrode paste production device and electrode paste production method that produce electrode paste by kneading a mixture of powder and solvent.

2. Description of Related Art

A power generating element of a battery is formed by impregnating an electrode element with an electrolyte solution. The electrode element is formed by laminating or winding a positive electrode, a negative electrode and a separator. The positive electrode is formed by drying electrode paste for a positive electrode, applied onto a positive electrode current collector, and then stamping the electrode paste. The negative electrode is formed by drying electrode paste for a negative electrode, applied onto a negative electrode current collector, and then stamping the electrode paste.

Such electrode paste is, for example, produced with the use of a continuous twin-shaft kneader described in Japanese Patent Application Publication No. 2005-222772 (JP 2005-222772 A). The continuous twin-shaft kneader described in JP 2005-222772 A has such a structure that a screw, paddles, and the like, are mounted on each of two rotary shafts that are rotatably supported in a hollow barrel. The continuous twin-shaft kneader described in JP 2005-222772 A transfers powder (active material, and the like) and solvent, separately injected into the barrel, by the screws, and applies high shearing force to powder passing between the paddles and the inner wall of the barrel by rotation of the paddles, and the like. After that, the continuous twin-shaft kneader described in JP 2005-222772 A produces electrode paste by diluting a mixture of the powder and the solvent with solvent, which is further injected into the barrel, by rotation of the paddles, and the like.

SUMMARY OF THE INVENTION

The continuous twin-shaft kneader described in JP 2005-222772 A applies high shearing force to the powder immediately after the powder and the solvent have been separately injected into the barrel. In this case, high shearing force may be applied to the powder in a state where the powder is not sufficiently wetted. In such a case, movement of the powder is poor, so the powder cannot escape between each paddle and the inner wall of the barrel, and directly receives high shearing load. When the powder receives high shearing load, particles of the active material break or chip.

For example, in producing electrode paste for a negative electrode, if particles of a negative electrode active material break or chip, easiness of conduction of ions and easiness of occurrence of ionization reaction at the surface of the negative electrode active material change when a battery is formed by using a negative electrode onto which the above electrode paste is applied. That is, with the continuous twin-shaft kneader described in JP 2005-222772 A, the particles of the active material may break or chip and, by extension, it may be not possible to ensure a battery characteristic as designed. Inconvenience that it is not possible to ensure a battery characteristic due to such breaks or chips of the particles of the active material also similarly applies to the case where electrode paste for a positive electrode is produced.

The invention provides an electrode paste production device and electrode paste production method that are able to suppress breaks and chips of particles of an active material.

A first aspect of the invention relates to an electrode paste production device. The electrode paste production device includes a hollow exterior component, two rotary shafts, a transfer portion, a rough mixing portion and a kneading portion. The hollow exterior component defines an injection zone, a rough mixing zone and a kneading zone. The rough mixing zone is located between the injection zone and the kneading zone. The two rotary shafts are supported by the exterior component in a state where the rotary shafts are located parallel to each other at a predetermined interval. The transfer portion is supported by the rotary shafts inside the exterior component. The transfer portion is configured to transfer separately injected powder and solvent to a downstream side in a transfer direction by rotation of the transfer portion in the injection zone. The rough mixing portion is supported by the rotary shafts inside the exterior component. The rough mixing portion is configured to produce a mixture by mixing the powder and the solvent in the rough mixing zone without applying a shearing force, which is higher than or equal to a predetermined shearing force, to the powder by rotation of the rough mixing portion. The kneading portion is supported by the rotary shafts inside the exterior component. The kneading portion is configured to produce electrode paste by kneading the mixture through application of a shearing force, which is higher than the shearing force that is applied in the rough mixing zone, to the mixture by rotation of the kneading portion in the kneading zone.

In the electrode paste production device, a clearance between an outer periphery of a rotational trajectory of the rough mixing portion and an inner wall of the exterior component may be larger than or equal to 3 mm and smaller than or equal to 10 mm.

In the electrode paste production device, an accumulated number of revolutions of each of the rotary shafts in an average residence time of the powder and the solvent in the rough mixing zone may be set to 300 or larger.

The electrode paste production device may further include a suppressing portion supported by the rotary shafts on a downstream side of the rough mixing portion in the transfer direction in the rough mixing zone, and the suppressing portion may be configured to suppress by rotation a transfer of the powder and the solvent to the downstream side in the transfer direction.

A second aspect of the invention relates to an electrode paste production method. The electrode paste production method may include: an injecting step of separately injecting powder and solvent into a hollow exterior component, and transferring the powder and the solvent to a downstream side in a transfer direction by rotation of two rotary shafts supported by the exterior component in a state where the rotary shafts are located parallel to each other at a predetermined interval; a rough mixing step of producing a mixture by mixing the powder and the solvent by rotation of the rotary shafts without applying a shearing force, which is higher than or equal to a predetermined shearing force, to the powder; and a kneading step of producing electrode paste by kneading the mixture through application of a shearing force, which is higher than the shearing force that is applied in the rough mixing step, to the mixture by rotation of the rotary shafts.

The invention has such an advantageous effect that it is possible to suppress breaks and chips of particles of an active material.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a partially cross-sectional view that shows the configuration of an electrode paste production device according to a first embodiment;

FIG. 8A is a view that illustrates impellers according to the second embodiment when the impellers are viewed in the transfer direction;

FIG. 8B is a perspective view that illustrates the impellers according to the second embodiment;

FIG. 11A is a view that illustrates impellers of which a radially outer end portion protrudes radially outward along the transfer direction when the impellers are viewed in the transfer direction;

FIG. 11B is a perspective view that illustrates the impellers of which each radially outer end portion protrudes radially outward along the transfer direction;

FIG. 13 is a table that shows the experimental results of the first embodiment and the second embodiment;

FIG. 15 is a table that shows the experimental results of the third embodiment;

FIG. 16 is a partially cross-sectional view that shows the configuration of an electrode paste production device according to a fourth embodiment;

FIG. 17 is a table that shows the experimental results of the fourth embodiment;

DETAILED DESCRIPTION OF EMBODIMENTS

Figure 2A:
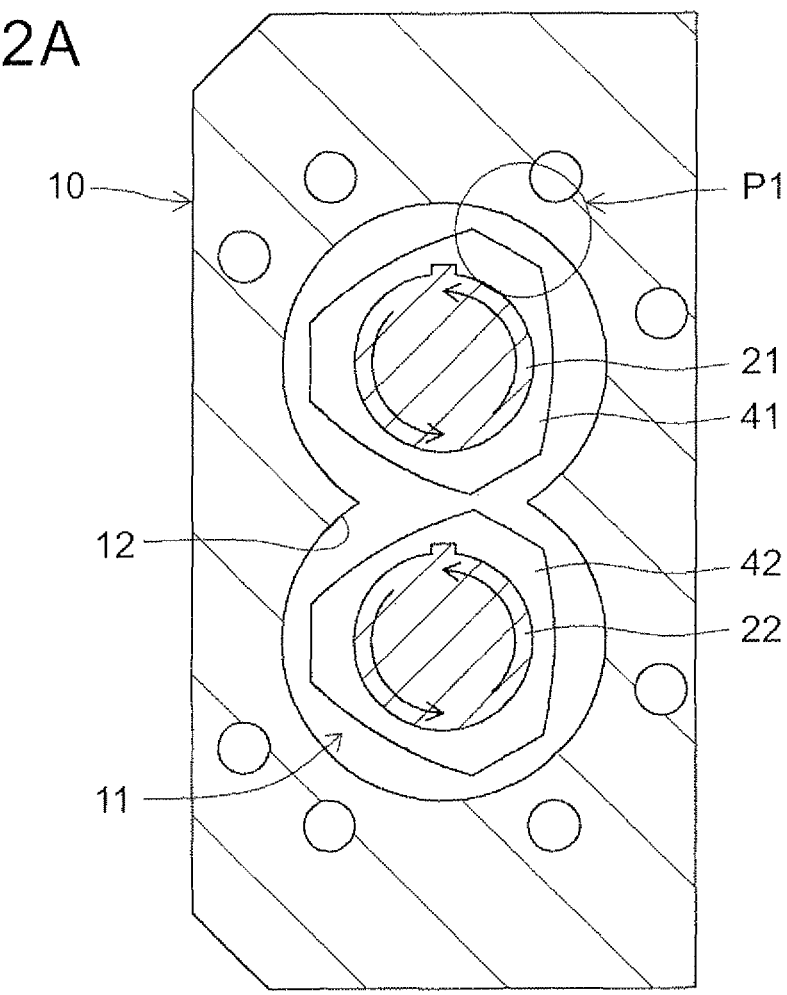
FIG. 2A is a view that illustrates 5 mm paddles when the 5 mm paddles are viewed in a transfer direction.

Hereinafter, an electrode paste production device 1 and an electrode paste production method according to a first embodiment will be described.

As shown in FIG. 1, the electrode paste production device 1 according to the first embodiment is to produce electrode paste for a positive electrode and electrode paste for a negative electrode by kneading powder, binder and solvent. The powder is made of an active Material, a thickener, and the like. It is assumed that the electrode paste production device 1 and the electrode paste production method according to the first embodiment produce electrode paste for a negative electrode for convenience in explanation.

In the following description, for convenience in explanation, a direction from the left side of the sheet toward the right side of the sheet in FIG. 1 is defined as a "transfer direction of the electrode paste production device 1" (see an arrow indicated at the upper side of the sheet in FIG. 1). The top-to-bottom direction of the sheet in FIG. 1 is defined as an "up-and-down direction of the electrode paste production device 1".

The electrode paste production device 1 includes a housing 10 and two rotary shafts 21, 22.

The housing 10 is a hollow member that constitutes the exterior component of the electrode paste production device 1. The hollow portion constitutes a kneading chamber 11.

The kneading chamber 11 has such a shape that two perfect circles partially overlap with each other when viewed in the transfer direction. The kneading chamber 11 extends in the transfer direction from the upstream side of the housing 10 to the downstream side of the housing 10 while maintaining the shape (see FIG. 2A). The upper and lower rotary shafts 21, 22 are respectively located at the centers of curvature of circular portions in the kneading chamber 11.

The upper and lower rotary shafts 21, 22 are rotatably supported by the housing 10 in a state where the rotary shafts 21, 22 are located parallel to each other at a predetermined interval in the up-and-down direction (direction perpendicular to an axial direction). The axial direction of each of the upper and lower rotary shafts 21, 22 is parallel to the transfer direction. The upper and lower rotary shafts 21, 22 are respectively connected to predetermined drive devices, and are configured to be able to rotate in arrow directions indicated at the right end portion of the sheet in FIG. 1 as the drive devices are driven.

The electrode paste production device 1 supports members, such as feed screws 31, 32 and 5 mm paddles 41, 42, with the use of the upper and lower rotary shafts 21, 22. Thus, an injection zone 30, a rough mixing zone 40 and a kneading zone 50 are defined in the kneading chamber 11 (inside the housing 10). The electrode paste production method produce electrode paste by carrying out predetermined steps in the respective zones 30 to 50 by rotating members respectively provided in the zones 30 to 50 by rotation of the upper and lower rotary shafts 21, 22.

The members, such as the feed screw 32 and the 5 mm paddles 42, supported by the lower rotary shaft 22 have the same shape as the members, such as the feed screw 31 and the 5 mm paddles 41, supported by the upper rotary shaft 21. Therefore, in the following description, the description of the shapes of the members, such as the feed screw 32 and the 5 mm paddles 42, supported by the lower rotary shaft 22 is omitted.

The injection zone 30 is a portion at which powder and solvent are injected into the housing 10. The injection zone 30 is formed at the upstream end portion of the kneading chamber 11. The feed screw 31 supported by the upper rotary shaft 21 and the feed screw 32 supported by the lower rotary shaft 22 are provided in the injection zone 30.

The upper feed screw 31 has spiral blade portions, and is supported concentrically with the upper rotary shaft 21 so as to cover the outer periphery of the upper rotary shaft 21. The upper and lower feed screws 31, 32 are arranged so as to face each other with the positions in the axial direction (transfer direction) aligned with each other, and do not contact with each other during rotation of the upper and lower rotary shafts 21, 22.

The housing 10 has a powder injection port 13 at a portion corresponding to an intermediate portion of the injection zone 30 in the transfer direction. The powder injection port 13 is open to the outside of an inner wall 12. Powder is injected through the powder injection port 13 (see an arrow T1 shown in FIG. 1). As in the case of the electrode paste production device 1 according to the first embodiment, when electrode paste for a negative electrode is produced, graphite that is a negative electrode active material, powdery CMC that is a thickener, and the like, are injected through the powder injection port 13 as the powder.

The housing 10 has a first solvent injection port 14 at a portion corresponding to the downstream end portion of the injection zone 30. The first solvent injection port 14 is open to the outside of the inner wall 12. The electrode paste production device 1 according to the first embodiment is configured to inject solvent in twice through the first solvent injection port 14 and a second solvent injection port 15 (described later) (see arrows T2, T3 shown in FIG. 1). In the first embodiment, water is injected through the solvent injection ports 14, 15 as the solvent.

That is, the electrode paste production device 1 is configured as follows. In the injection zone 30, not a mixture of powder and solvent is injected into the housing 10, but powder and solvent are separately injected into the housing 10.

In the injection zone 30, powder and solvent are transferred to the downstream side with respect to the injection zone 30 by rotating the upper and lower feed screws 31, 32 around their axes by rotation of the upper and lower rotary shafts 21, 22.

That is, the upper and lower feed screws 31, 32 function as a transfer portion that transfers powder and solvent by rotation. In addition, the electrode paste production method carries out an injecting step of separately injecting powder and solvent into the housing 10 and transferring the powder and the solvent to the downstream side by rotation of the upper and lower rotary shafts 21, 22.

The rough mixing zone 40 is a portion at which powder and solvent are mixed. The rough mixing zone 40 is located adjacent to the injection zone 30 on the downstream side of the injection zone 30. The two 5 mm paddles 41 and the two 5 mm paddles 42 are provided in the rough mixing zone 40. The 5 mm paddles 41 are supported by the upper rotary shaft 21. The 5 mm paddles 42 are supported by the lower rotary shaft 22.

Figure 2B:
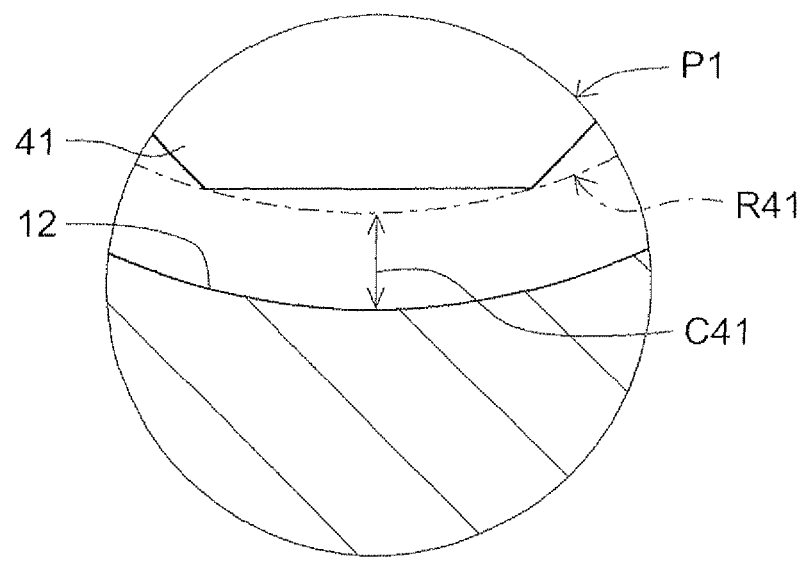
FIG. 2B is a view that illustrates one of the 5 mm paddles in magnified view of a portion indicated by P1 in FIG. 2A.

As shown in FIG. 2A and FIG. 2B, each of the upper 5 mm paddles 41 is formed in a shape such that vertex portions of a triangle are cut out when viewed in the transfer direction, and is supported concentrically with the upper rotary shaft 21 so as to cover the outer periphery of the upper rotary shaft 21.

A somewhat large clearance C41 is formed between the inner wall 12 of the housing 10 and each upper 5 mm paddle 41.

The clearance C41 between the inner wall 12 of the housing 10 and each of the upper 5 mm paddles 41 is a clearance along the radial direction of the upper rotary shaft 21 between an outer periphery R41 of a rotational trajectory of each 5 mm paddle 41 and the upper side (portion corresponding to an upper perfect circle when the kneading chamber 11 is viewed in the transfer direction) of the inner wall 12 of the housing 10. That is, the clearance C41 is a clearance along the radial direction of the upper rotary shaft 21 from a portion of each upper 5 mm paddle 41, closest to the inner wall 12 of the housing 10, to the upper side of the inner wall 12 of the housing 10. In the first embodiment, the clearance C41 is set to about 5 mm.

As shown in FIG. 1, FIG. 2A and FIG. 2B, the downstream-side 5 mm paddle 41 is arranged at a shifted phase with respect to the upstream-side 5 mm paddle 41. The upper and lower 5 mm paddles 41, 42 are arranged so as to face each other with the positions in the axial direction aligned with each other, and the facing pairs of upper and lower 5 mm paddles 41, 42 are arranged at the same phase. In addition, the upper and lower 5 mm paddles 41, 42 do not contact with each other during rotation of the upper and lower rotary shafts 21, 22.

In the rough mixing zone 40, the upper and lower 5 mm paddles 41, 42 are rotated around their axes by rotation of the upper and lower rotary shafts 21, 22.

Figure 3:
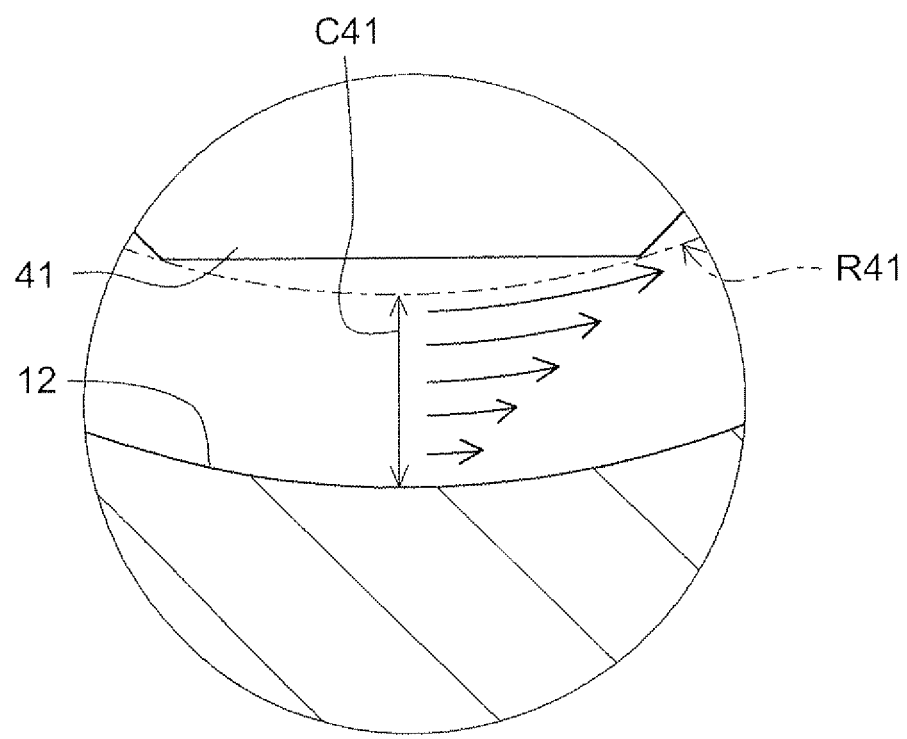
FIG. 3 is a view that illustrates a shear velocity around one of the 5 mm paddles.

As described above, a somewhat large clearance is formed between the inner wall 12 of the housing 10 and each of the upper and lower 5 mm paddles 41, 42. Therefore, as shown in FIG. 3, the velocity gradient of powder is gentle between the inner wall 12 of the housing 10 and each of the upper and lower 5 mm paddles 41, 42 (see arrows shown in FIG. 3). That is, the shear velocity between the inner wall 12 of the housing 10 and each of the upper and lower 5 mm paddles 41, 42 decreases. Thus, in the rough mixing zone 40, high shearing force is not applied to powder.

In this way, in the rough mixing zone 40, a mixture of powder and solvent is produced by mixing the powder and the solvent without applying high shearing force to the powder.

That is, the upper and lower 5 mm paddles 41, 42 function as a rough mixing portion that mixes powder and solvent.

In addition, the electrode paste production method carries out a rough mixing step of producing a mixture of powder and solvent by mixing the powder and the solvent by rotation of the upper and lower rotary shafts 21, 22 without applying high shearing force to the powder.

Here, when one of a set of the upper 5 mm paddles 41 and a set of the lower 5 mm paddles 42 is located closest to the other set of the 5 mm paddles, a clearance of about 5 mm is formed between the upper and lower 5 mm paddles 41, 42 as in the case of the clearance C41 (see FIG. 2A and FIG. 2B). Therefore, the upper and lower 5 mm paddles 41, 42 are able to transfer powder and solvent located therebetween to between the inner wall 12 of the housing 10 and each of the upper and lower 5 mm paddles 41, 42. Thus, the electrode paste production device 1 according to the first embodiment facilitates mixing action in the rough mixing zone 40.

As shown in FIG. 1, the kneading zone 50 is a portion at which electrode paste is produced by kneading the mixture. The kneading zone 50 is arranged downstream of the rough mixing zone 40. The kneading zone 50 includes a stiffening zone 60, a diluting zone 70, a binder mixing zone 80 and a return zone 90.

The stiffening zone 60 is a portion at which the mixture is kneaded in a state where the solid content percentage (the weight percentage of powder with respect to the weight of powder and solvent as a whole) of the mixture is higher than the solid content percentage of the electrode paste. The stiffening zone 60 is located adjacent to the rough mixing zone 40 on the downstream side of the rough mixing zone 40. That is, the stiffening zone 60 is arranged at the upstream end portion of the kneading zone 50. Four 1 mm paddles 61, a resistance paddle 63, four 1 mm paddles 62 and a resistance paddle 64 are provided in the stiffening zone 60. The 1 mm paddles 61 and the resistance paddle 63 are supported by the upper rotary shaft 21. The 1 mm paddles 62 and the resistance paddle 64 are supported by the lower rotary shaft 22.

Figure 4A:
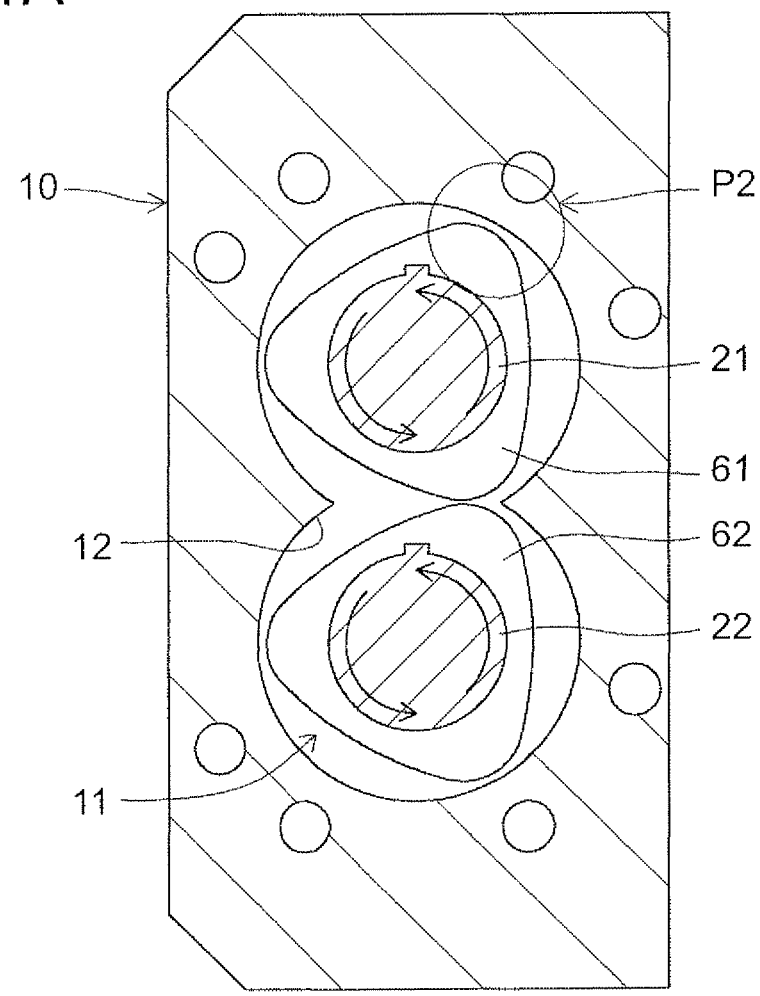
FIG. 4A is a view that illustrates 1 mm paddles when the 1 mm paddles are viewed in the transfer direction.
Figure 4B:
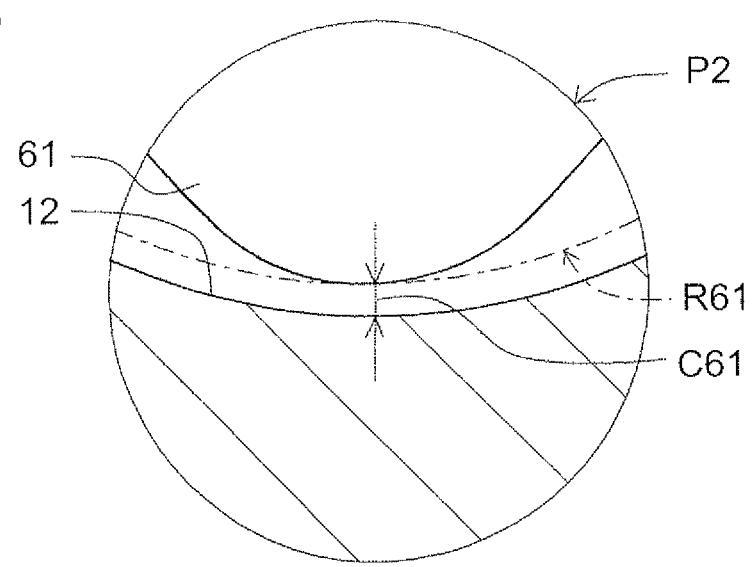
FIG. 4B is a view that illustrates one of the 1 mm paddles in magnified view of a portion indicated by P2 in FIG. 4A.

As shown in FIG. 4A and FIG. 4B, each upper 1 mm paddle 61 is formed in a substantially triangular shape when viewed in the transfer direction, and is supported concentrically with the upper rotary shaft 21 so as to cover the outer periphery of the upper rotary shaft 21.

A clearance C61 is formed between the inner wall 12 of the housing 10 and each upper 1 mm paddle 61. The clearance C61 is smaller than the clearance C41 (see FIG. 2B) between the inner wall 12 of the housing 10 and each upper 5 mm paddle 41.

The clearance C61 is a clearance along the radial direction of the upper rotary shaft 21 between an outer periphery R61 of a rotational trajectory of each 1 mm paddle 61 and the upper side (portion corresponding to an upper perfect circle when the kneading chamber 11 is viewed in the transfer direction) of the inner wall 12 of the housing 10. That is, the clearance C61 is a clearance along the radial direction of the upper rotary shaft 21 from a portion of each upper 1 mm paddle 61, closest to the inner wall 12 of the housing 10, to the upper side of the inner wall 12 of the housing 10. In the first embodiment, the clearance C61 is set to about 1 mm.

As shown in FIG. 1, FIG. 4A and FIG. 4B, the upper 1 mm paddles 61 are arranged from the upstream end portion of the kneading zone 50 to the downstream side of the kneading zone 50 in a state where the phase is shifted sequentially from the 1 mm paddle 61 located at the upstream side. The upper and lower 1 mm paddles 61, 62 are arranged so as to face each other with the positions in the axial direction aligned with each other, and the facing pairs of upper and lower 1 mm paddles 61, 62 are arranged at the same phase. In addition, the upper and lower 1 mm paddles 61, 62 do not contact with each other during rotation of the upper and lower rotary shafts 21, 22.

As shown in FIG. 1, the upper resistance paddle 63 is supported concentrically with the upper rotary shaft 21 so as to cover the outer periphery of the upper rotary shaft 21, and is arranged at the downstream end portion of the stiffening zone 60. The upper resistance paddle 63 is formed in a substantially stepped disc shape such that the downstream side protrudes radially outward. The upper resistance paddle 63 includes a small disc portion 63a and a large disc portion 63b.

The small disc portion 63a is an upstream-side disc portion of the resistance paddle 63. The thickness (length in the axial direction) of the small disc portion 63a is slightly larger than the thickness of the large disc portion 63b.

The large disc portion 63b is a downstream-side disc portion of the resistance paddle 63, that is, a portion that protrudes radially outward of the resistance paddle 63.

The lower resistance paddle 64 is configured such that the positional relationship between a small disc portion 64a and a large disc portion 64b in the transfer direction is opposite with respect to the positional relationship between the small disc portion 63a and large disc portion 63b of the upper resistance paddle 63.

The upper and lower resistance paddles 63, 64 are arranged so as to face each other with the positions in the axial direction aligned with each other. At this time, a minute clearance by which it is possible to compress powder is formed between the inner wall 12 of the housing 10 and each of the upper and lower large disc portions 63b, 64b and between the upper and lower resistance paddles 63, 64.

A portion between the upper and lower resistance paddles 63, 64 is a portion between the lower end portion of the upper small disc portion 63a and the upper end portion of the lower large disc portion 64b, a portion between the upstream end face of the upper large disc portion 63b and the downstream end face of the lower large disc portion 64b and a portion between the lower end portion of the upper large disc portion 63b and the upper end portion of the lower small disc portion 64a. That is, the upper and lower resistance paddles 63, 64 do not contact with each other during rotation of the upper and lower rotary shafts 21, 22.

As shown in FIG. 4A and FIG. 4B, in the stiffening zone 60, the upper and lower 1 mm paddles 61, 62 are rotated around their axes by rotation of the upper and lower rotary shafts 21, 22.

Figure 5:
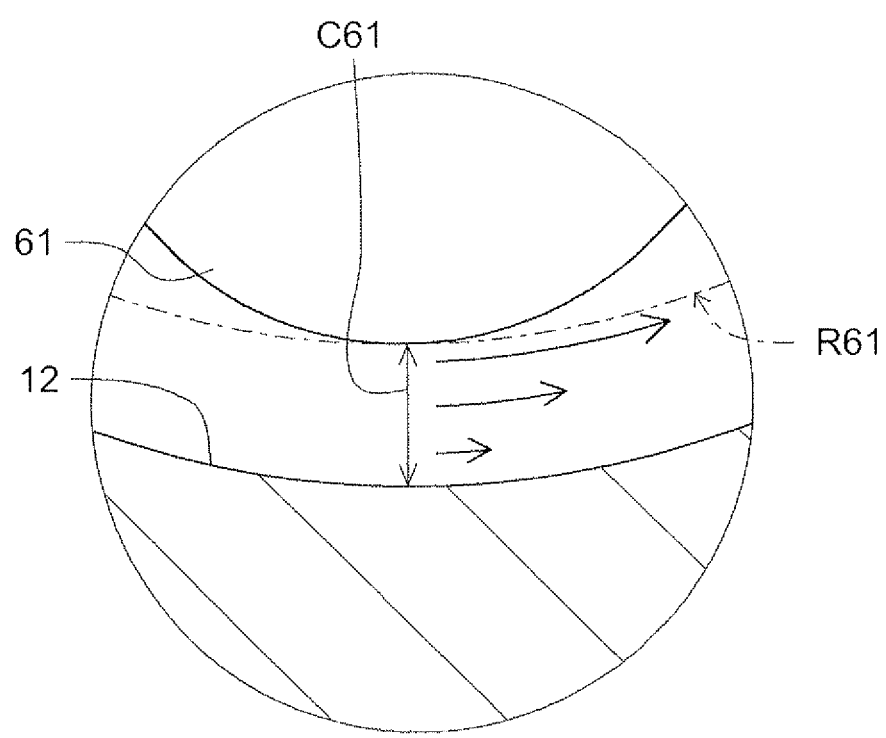
FIG. 5 is a view that shows a shear velocity around each of the 1 mm paddles.

As described above, a clearance is formed between the inner wall 12 of the housing 10 and each of the upper and lower 1 mm paddles 61, 62. The clearance is smaller than the clearance C41 between the inner wall 12 of the housing 10 and each upper 5 mm paddle 41. Therefore, as shown in FIG. 5, the velocity gradient of powder is steep between the inner wall 12 of the housing 10 and each of the upper and lower 1 mm paddles 61, 62 (see arrows shown in FIG. 5). That is, the shear velocity between the inner wall 12 of the housing 10 and each of the upper and lower 1 mm paddles 61, 62 is higher than the shear velocity between the inner wall 12 of the housing 10 and each of the upper and lower 5 mm paddles 41, 42. Thus, in the stiffening zone 60, shearing force higher than the shearing force that is applied in the rough mixing zone 40 is applied to the mixture.

After high shearing force has been applied to the mixture, the upper and lower resistance paddles 63, 64 are rotated around their axes by rotation of the upper and lower rotary shafts 21, 22 in the stiffening zone 60 as shown in FIG. 1. That is, in the stiffening zone 60, powder is compressed between the inner wall 12 of the housing 10 and each of the upper and lower large disc portions 63b, 64b and between the upper and lower resistance paddles 63, 64 by rotation of the upper and lower resistance paddles 63, 64. Thus, in the stiffening zone 60, a primary kneaded material is produced.

The diluting zone 70 is a portion at which the primary kneaded material is diluted with solvent. The diluting zone 70 is located adjacent to the stiffening zone 60 on the downstream-side of the stiffening zone 60. A feed screw 71, six 1 mm paddles 73, a resistance paddle 75, a feed screw 72, six 1 mm paddles 74 and a resistance paddle 76 are provided in the diluting zone 70. The feed screw 71, the 1 mm paddles 73 and the resistance paddle 75 are supported by the upper rotary shaft 21. The feed screw 72, the 1 mm paddles 74 and the resistance paddle 76 are supported by the lower rotary shaft 22.

The upper and lower feed screws 71, 72 are configured similarly to the feed screws 31, 32 of the injection zone 30 except that the upper and lower feed screws 71, 72 are arranged at the upstream end portion of the diluting zone 70 and the length along the transfer direction is short.

The upper and lower 1 mm paddles 73, 74 are configured similarly to the 1 mm paddles 61, 62 of the stiffening zone 60 except that the upper and lower 1 mm paddles 73, 74 are arranged between the upstream side and downstream side of the diluting zone 70.

The upper and lower resistance paddles 75, 76 are configured similarly to the resistance paddles 63, 64 of the stiffening zone 60 except that the upper and lower resistance paddles 75, 76 are arranged at the downstream end portion of the diluting zone 70. That is, the upper resistance paddle 75 has a small disc portion 75a and a large disc portion 75b respectively having the same shape as the small disc portion 63a and large disc portion 63b of the upper resistance paddle 63, and the lower resistance paddle 76 has a small disc portion 76a and a large disc portion 76b respectively having the same shape as the small disc portion 64a and large disc portion 64b of the resistance paddle 64.

The housing 10 has the second solvent injection port 15 at a portion corresponding to the upstream side of the diluting zone 70. The second solvent injection port 15 is open to the outside of the inner wall 12. The other solvent required to produce the electrode paste (solvent other than the solvent supplied through the first solvent injection port 14) is injected through the second solvent injection port 15 (see an arrow T3 shown in FIG. 1).

In the diluting zone 70, by rotating the upper and lower feed screws 71, 72 around their axes by rotation of the upper and lower rotary shafts 21, 22, the primary kneaded material and the solvent injected through the solvent injection port 15 are transferred to the downstream side of the diluting zone 70. Then, in the diluting zone 70, the upper and lower 1 mm paddles 73, 74 are rotated around their axes by rotation of the upper and lower rotary shafts 21, 22, and high shearing force is applied to the primary kneaded material (mixture) as in the case of the upper and lower 1 mm paddles 61, 62 of the stiffening zone 60. After that, in the diluting zone 70, the powder is compressed by rotating the upper and lower resistance paddles 75, 76 around their axes by rotation of the upper and lower rotary shafts 21, 22.

Thus, in the diluting zone 70, slurry in which the particles of the negative electrode active material are dispersed in a medium made of solvent, CMC, and the like, is produced by diluting the primary kneaded material with the solvent that is injected through the second solvent injection port 15.

The binder mixing zone 80 is a portion at which the slurry is mixed with binder. The binder mixing zone 80 is located adjacent to the diluting zone 70 on the downstream side of the diluting zone 70. A feed screw 81, two 1 mm paddles 83, a feed screw 82 and two 1 mm paddles 84 are provided in the binder mixing zone 80. The feed screw 81 and the 1 mm paddles 83 are supported by the upper rotary shaft 21. The feed screw 82 and the 1 mm paddles 84 are supported by the lower rotary shaft 22.

The upper and lower feed screws 81, 82 are configured similarly to the feed screws 71, 72 of the diluting zone 70 except that the upper and lower feed screws 81, 82 are arranged at the upstream end portion of the binder mixing zone 80.

The upper and lower 1 mm paddles 83, 84 are configured similarly to the 1 mm paddles 73, 74 of the diluting zone 70 except that the upper and lower 1 mm paddles 83, 84 are arranged between the intermediate portion of the binder mixing zone 80 in the transfer direction and the downstream end portion of the binder mixing zone 80.

The housing 10 has a binder injection port 16 at a portion corresponding to the upstream end portion of the binder mixing zone 80. The binder injection port 16 is open to the outside of the inner wall 12. The binder is injected through the binder injection port 16 (see an arrow T4 shown in FIG. 1). As in the case of the electrode paste production device 1 according to the first embodiment, when the electrode paste for a negative electrode is produced, SBR, or the like, is injected through the binder injection port 16 as the binder.

The housing 10 has a discharge port 17 at a portion corresponding to the downstream end portion of the binder mixing zone 80. The discharge port 17 is open to the outside of the inner wall 12.

In the binder mixing zone 80, the slurry and the binder that is injected through the binder injection port 16 are transferred to the downstream side of the binder mixing zone 80 by rotating the upper and lower feed screws 81, 82 around the axes by rotation of the upper and lower rotary shafts 21, 22. Then, in the binder mixing zone 80, the upper and lower 1 mm paddles 83, 84 are rotated around their axes by rotation of the upper and lower rotary shafts 21, 22, and, as in the case of the upper and lower 1 mm paddles 61, 62 of the stiffening zone 60, the binder is added to the slurry while applying high shearing force to the slurry (mixture).

Thus, the electrode paste production device 1 produces the electrode paste. After that, in the binder mixing zone 80, the produced electrode paste is discharged to the outside of the housing 10 through the discharge port 17 (see an arrow T5 shown in FIG. 1).

In this way, the upper and lower 1 mm paddles 61, 62, 73, 74, 83, 84 provided in the kneading zone 50 are supported by the upper and lower rotary shafts 21, 22, and function as a kneading portion that applies shearing force, which is higher than the shearing force applied in the rough mixing zone 40, to the mixture. In addition, the kneading zone 50 kneads the mixture by applying shearing force, which is higher than the shearing force that is applied in the rough mixing zone 40, to the mixture by rotation of the upper and lower 1 mm paddles 61, 62, 73, 74, 83, 84. Then, the electrode paste production method carries out a kneading step of kneading the mixture by applying shearing force, which is higher than the shearing force that is applied in the rough mixing step, to the mixture by rotation of the upper and lower rotary shafts 21, 22.

The return zone 90 is a portion at which the electrode paste is returned to the discharge port 17. The return zone 90 is formed at the downstream end portion of the kneading chamber 11, and is located adjacent to the binder mixing zone 80 on the downstream side of the binder mixing zone 80. A return screw 91 and a return screw 92 are provided in the return zone 90. The return screw 91 is supported by the upper rotary shaft 21. The return screw 92 is supported by the lower rotary shaft 22.

The upper and lower return screws 91, 92 are configured similarly to the feed screws 81, 82 of the binder mixing zone 80 except that the upper and lower return screws 91, 92 are arranged in the return zone 90 and the orientations of the spiral blade portions are opposite.

In the return zone 90, the upper and lower return screws 91, 92 are rotated around their axes by rotation of the upper and lower rotary shafts 21, 22. Thus, the electrode paste is pushed back in the direction (upstream side) opposite to the transfer direction, and the electrode paste is discharged to the outside of the housing 10 through the discharge port 17.

As described above, the electrode paste production device 1 and the electrode paste production method produce the electrode paste by kneading the mixture by rotation of the upper and lower rotary shafts 21, 22.

That is, the electrode paste production device 1 according to the first embodiment significantly differs from the continuous twin-axis kneader according to the related art in that powder and solvent that are separately injected into the housing 10 are mixed in the rough mixing zone 40 before being transferred to the stiffening zone 60.

As described above, in the rough mixing zone 40, powder and solvent are mixed without applying high shearing force to the powder. Thus, in the rough mixing zone 40, before powder and solvent are transferred to the stiffening zone 60, the powder is sufficiently wetted.

At this time, the electrode paste production device 1 according to the first embodiment allows solvent to be easily present between the inner wall 12 of the housing 10 and each of the upper and lower 5 mm paddles 41, 42 by forming a somewhat large clearance between the inner wall 12 of the housing 10 and each of the upper and lower 5 mm paddles 41, 42.

Thus, the electrode paste production device 1 according to the first embodiment is able to inhibit a situation that only powder is located between the inner wall 12 of the housing 10 and each of the upper and lower 5 mm paddles 41, 42 when the powder is wetted. Therefore, the electrode paste production device 1 according to the first embodiment is able to prevent the particles of the negative electrode active material from breaking or chipping in the rough mixing zone 40.

By sufficiently wetting powder in the rough mixing zone 40, the electrode paste production device 1 according to the first embodiment is able to provide desirable movement of the powder in the stiffening zone 60.

Thus, when high shearing force is applied to the mixture in the stiffening zone 60, the electrode paste production device 1 according to the first embodiment is able to prevent powder from stagnating in the clearance between the inner wall 12 of the housing 10 and each of the upper and lower 1 mm paddles 61, 62 (see the clearance C61 shown in FIG. 4B). That is, the electrode paste production device 1 according to the first embodiment is able to allow powder to escape from the clearance between the inner wall 12 of the housing 10 and each of the upper and lower 1 mm paddles 61, 62.

With this configuration, the electrode paste production device 1 and the electrode paste production method are able to prevent powder from directly receiving high shearing load in the stiffening zone 60, so it is possible to suppress breaks and chips of the particles of the negative electrode active material. That is, the electrode paste production device 1 is able to disperse the particles of the negative electrode active material in a medium formed of solvent, CMC, and the like, without breaking the particles of the negative electrode active material.

Thus, when a battery is formed using a negative electrode onto which the electrode paste produced by the electrode paste production device 1 and the electrode paste production method according to the first embodiment is applied, it is possible to suppress changes of easiness of conduction of ions and easiness of occurrence of ionization reaction at the surface of the active material. Therefore, the electrode paste production device 1 and the electrode paste production method according to the first embodiment are able to ensure the battery characteristic as designed.

That is, in the first embodiment, high shearing force is such a high shearing force that the particles of the negative electrode active material break or chip when shearing force is applied to powder not sufficiently wetted.

Here, the amount of solvent that is injected through each of the solvent injection ports 14, 15 is adjusted as needed before injection on the basis of the amount of adsorption of oil (linseed oil) (hereinafter, referred to as "oil absorption") that is adsorbed by the negative electrode active material. If the oil absorption of the negative electrode active material is low, the amount of solvent that is injected through the first solvent injection port 14 reduces. In this case, high shearing force is applied to the mixture in the stiffening zone 60 in a state where the solid content percentage of the mixture is relatively high.

In the case where the solid content percentage is high in this way, powder is hard to be sufficiently wetted only by being transferred by the upper and lower feed screws 31, 32. Thus, in this case, in the continuous twin-axis kneader according to the related art, powder easily receives high shearing load directly, so the particles of the negative electrode active material easily break or chip (see FIG. 5).

On the other hand, the electrode paste production device 1 mixes powder and solvent in the rough mixing zone 40 before high shearing force is applied to the powder in the kneading zone 50. Therefore, the electrode paste production device 1 and the electrode paste production method according to the first embodiment is able to sufficiently wet powder before high shearing force is applied to the mixture even when the oil absorption is low, so it is possible to suppress breaks and chips of the particles of the negative electrode active material.

In this way, the rough mixing zone 40 is formed between the injection zone 30 and the kneading zone 50. In addition, in the electrode paste production method, the rough mixing step is carried out after the injecting step has been carried out and before the kneading step is carried out.

Figure 6:
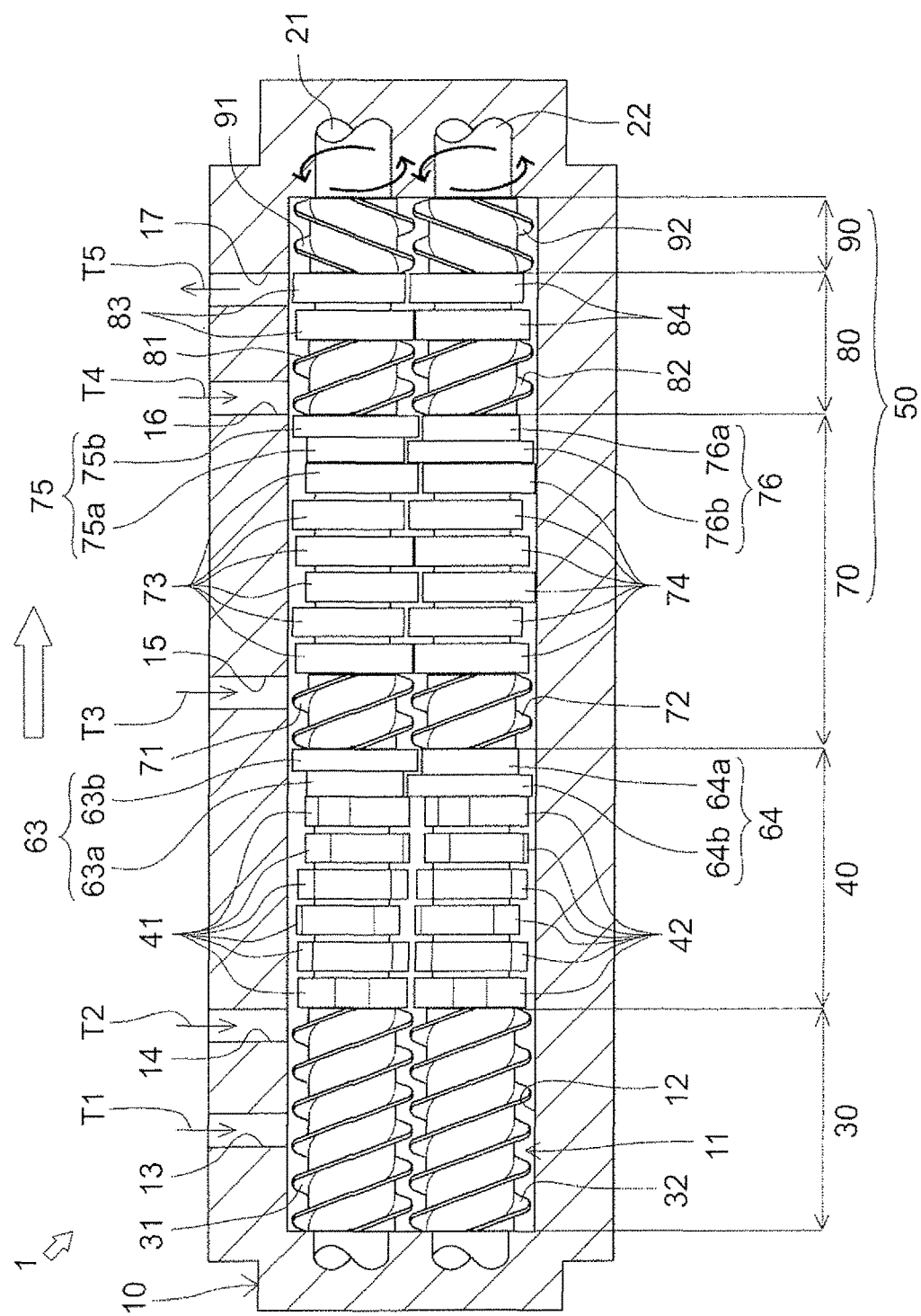
FIG. 6 is a partially cross-sectional view that shows the configuration of an electrode paste production device when a rough mixing zone also serves as a stiffening zone.

The rough mixing zone 40 may be designed to also serve as the stiffening zone 60. That is, the following configuration is also applicable. As shown in FIG. 6, six pairs of the 5 mm paddles 41, 42 are provided in the rough mixing zone 40, powder and solvent are sufficiently mixed by the 5 mm paddles 41, 42, and then the resultant powder is compressed by the upper and lower resistance paddles 63, 64. In this case, a portion at which the six pairs of 5 mm paddles 41, 42 and the resistance paddles 63, 64 are provided corresponds to the rough mixing zone 40. In addition, the kneading zone 50 is formed of the diluting zone 70, the binder mixing zone 80 and the return zone 90.

Next, an electrode paste production device 101 and an electrode paste production method according to a second embodiment will be described.

Figure 7:
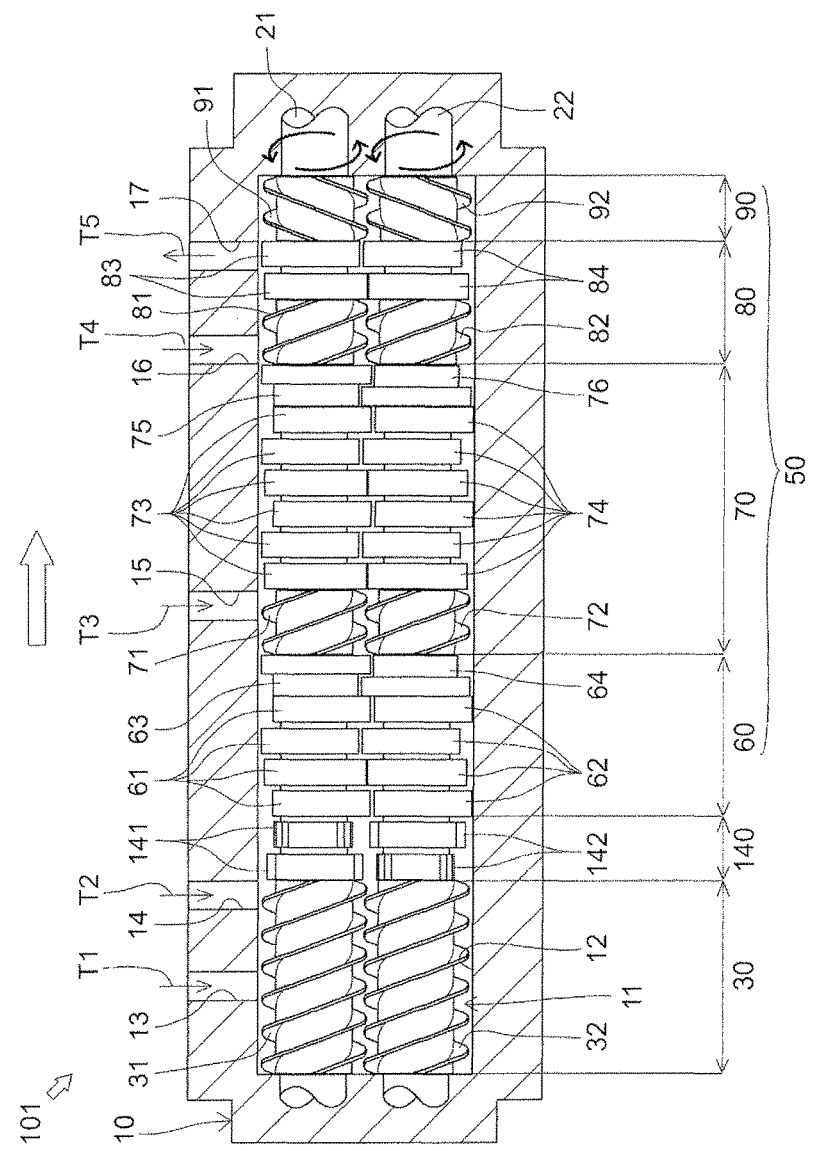
FIG. 7 is a partially cross-sectional view that shows the configuration of an electrode paste production device according to a second embodiment.

As shown in FIG. 1 and FIG. 7, the electrode paste production device 101 according to the second embodiment differs from the electrode paste production device 1 according to the first embodiment in that upper and lower impellers 141, 142 are provided in a rough mixing zone 140 instead of the upper and lower 5 mm paddles 41, 42.

Therefore, in the following description, like reference numerals denote members corresponding to the members of the electrode paste production device 1 according to the first embodiment, other than the rough mixing zone 140 and the upper and lower impellers 141, 142, and the description thereof is omitted.

As shown in FIG. 8A and FIG. 8B, each upper impeller 141 has a shaft portion 141a and four blade portions 141b, and each lower impeller 142 has a shaft portion 142a and four blade portions 142b. Each lower impeller 142 has the same shape as each upper impeller 141, so the description of the shape of each lower impeller 142 is omitted.

The shaft portions 141a are supported by the upper rotary shaft 21. The upper impellers 141 rotate integrally with the rotation of the upper rotary shaft 21.

The blade portions 141b are formed on the outer periphery of each shaft portion 141a. Each blade portions 141b protrudes from the outer periphery of the corresponding shaft portion 141a radially outward of the upper rotary shaft 21, and is a substantially quadrangular prism-shaped portion that extends along the transfer direction. The length of each blade portion 141b along the transfer direction is substantially the same as the length of the corresponding shaft portion 141a along the transfer direction. The blade portions 141b are arranged at equally shifted phases with reference to the center of the corresponding shaft portion 141a.

A clearance (see the clearance C41 shown in FIG. 2B) is formed between the outer periphery of a rotational trajectory of each impeller 141 and the upper side of the inner wall 12 of the housing 10. The length of the clearance along the radial direction of the upper rotary shaft 21 is about 5 mm as in the case of each 5 mm paddle 41 according to the first embodiment.

The downstream-side impeller 141 is arranged at a shifted phase with respect to the upstream-side impeller 141. The upper and lower impellers 141, 142 are arranged so as to face each other with the positions in the axial direction aligned with each other, and the facing pairs of the upper and lower impellers 141, 142 are located at mutually shifted phases. In addition, the upper and lower impellers 141, 142 do not contact with each other during rotation of the upper and lower rotary shafts 21, 22.

As shown in FIG. 7, FIG. 8A and FIG. 83, in the rough mixing zone 140, a mixture is produced by mixing powder and solvent by rotating the upper and lower impellers 141, 142 around the axes by rotation of the upper and lower rotary shafts 21, 22.

In this way, the upper and lower impellers 141, 142 are provided in the rough mixing zone 140, so spatial allowance arises (see FIG. 2B) as compared to the rough mixing zone 40 according to the first embodiment.

Therefore, the electrode paste production device 101 and the electrode paste production method according to the second embodiment are able to further suppress breaks and chips of the particles of the negative electrode active material in the rough mixing zone 140 (rough mixing step).

The blade portions of each of the upper and lower impellers extend along the transfer direction; however, the blade portions are not limited to this configuration.

Figure 9A:
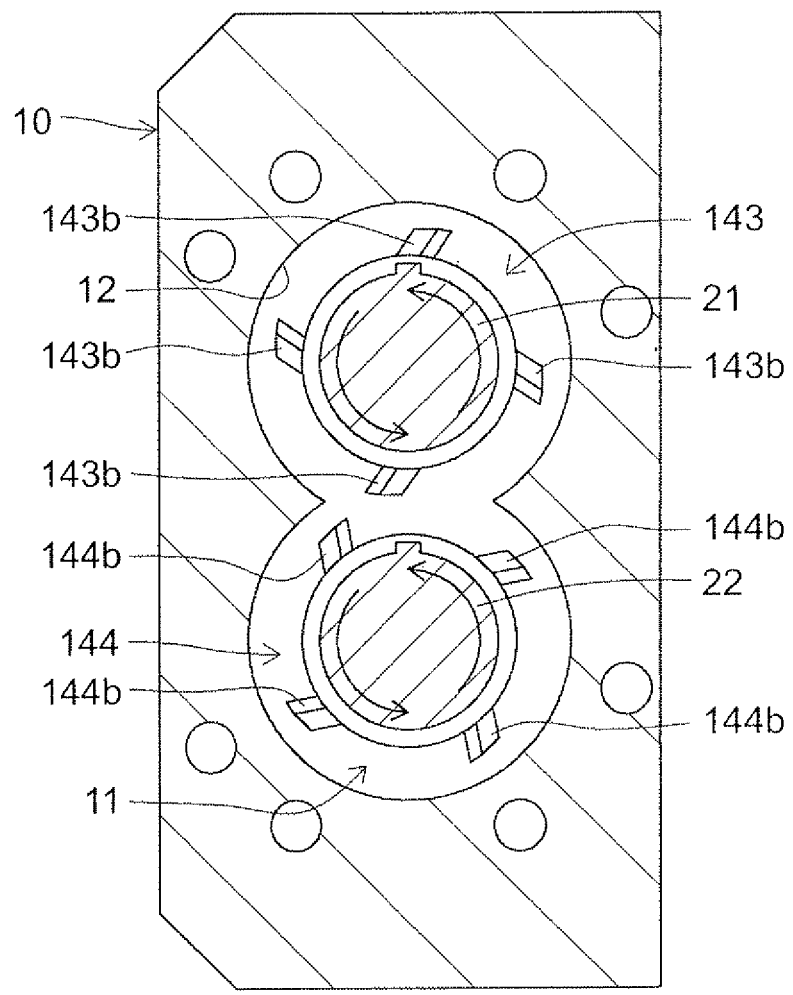
FIG. 9A is a view that illustrates twisted impellers when the twisted impellers are viewed in the transfer direction.
Figure 9B:
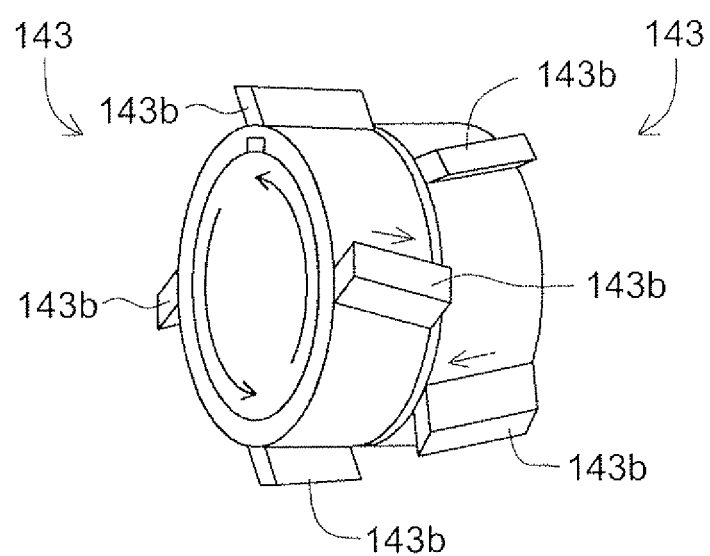
FIG. 9B is a perspective view that illustrates the twisted impellers.

That is, the blade portions of each of the upper and lower impellers may be inclined by a predetermined angle with respect to the transfer direction as in the case of blade portions 143b, 144b of upper and lower twisted impellers 143, 144 shown in FIG. 9A and FIG. 9B. That is, the blade portions of each of the upper and lower impellers may be twisted with respect to the transfer direction.

With this configuration, the electrode paste production device 101 according to the second embodiment is able to generate material flow in the transfer direction or in the direction opposite to the transfer direction on the basis of the orientation of twisting with respect to the transfer direction (see arrows shown in FIG. 9B).

Thus, the electrode paste production device 101 and the electrode paste production method according to the second embodiment are able to efficiently mix powder and solvent in the rough mixing zone 140 (rough mixing step), so it is possible to efficiently wet the powder.

In addition, the shape of each blade portion of each impeller does not always need to be a substantially quadrangular prism shape. For example, the shape of each blade portion of each impeller may be a shape shown in FIG. 10A and FIG. 10B or a shape shown in FIG. 11A and FIG. 11B.

Figure 10A:
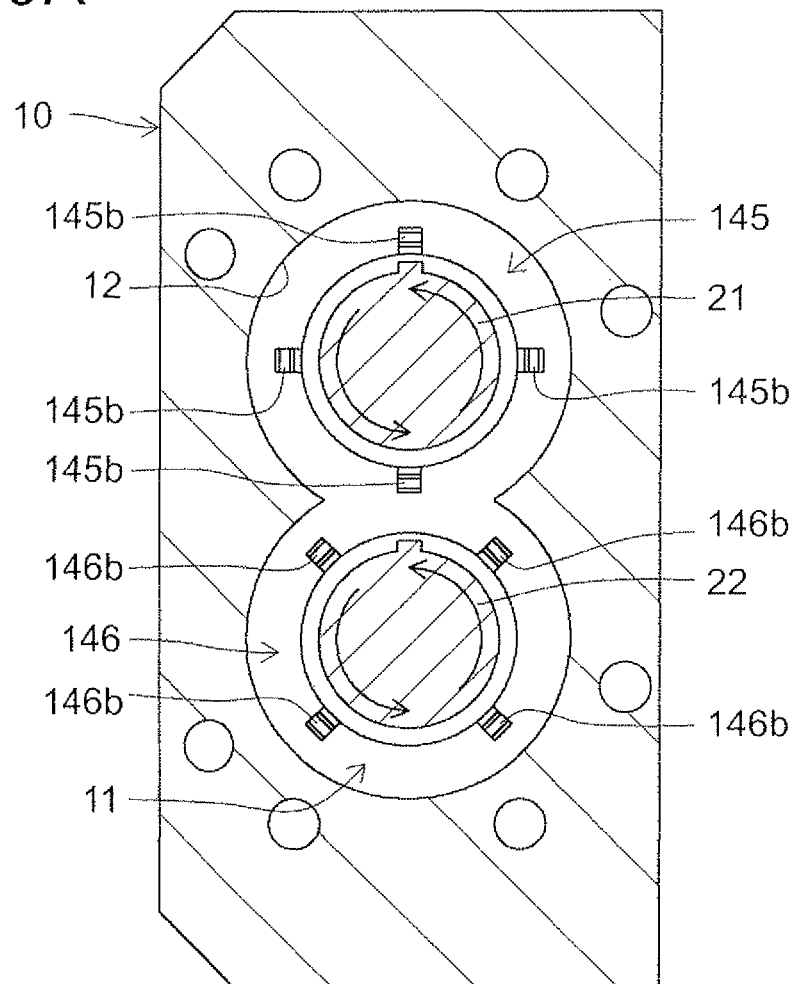
FIG. 10A is a view that illustrates impellers of which an end face of each blade portion partially protrudes when the impellers are viewed in the transfer direction.
Figure 10B:
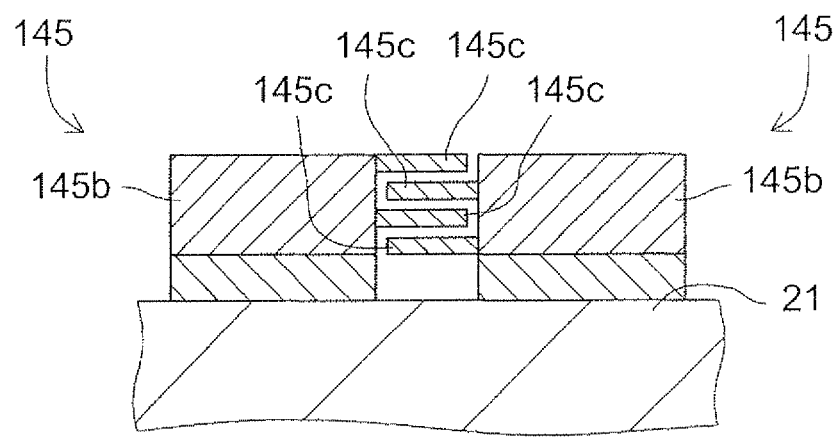
FIG. 10B is a view that illustrates the impellers of which the end face of each blade portion partially protrudes when the impellers are viewed in a direction perpendicular to the transfer direction.

Blade portions 145b, 146b of upper and lower impellers 145, 146 shown in FIG. 10A and FIG. 10B differ from the blade portions 141b, 142b shown in FIG. 8A and FIG. 8B in that two protruding portions 145c, 146c are formed. The protruding portions 146c of each lower impeller 146 have the same shape as the protruding portions 145c of each upper impeller 145, so the description of the shape is omitted.

The protruding portions 145c of the upstream-side (left-side in FIG. 10B) impeller 145 partially protrude from the downstream end face (right end face in FIG. 10B) of each blade portion 145b toward the downstream side. The upstream-side protruding portions 145c protrude from a radially outer end portion (upper end portion in FIG. 10B) and radially inward (lower side in FIG. 10B) of each blade portion 145b.

The protruding portions 145c of the downstream-side (right-side in FIG. 10B) impeller 145 partially protrude from the upstream end face (left end face in FIG. 10B) of each blade portion 145b toward the upstream side. The downstream-side protruding portions 145c protrude from a radially outward (upper side in FIG. 10B) and radially inner end portion (lower end portion in FIG. 10B) of the upstream end face of each blade portion 145b.

That is, the upstream-side and downstream-side protruding portions 145c separately protrude from different portions of the facing end faces of the blade portions 145b so as not to contact with each other when arranged at the same phase.

In FIG. 10B, for convenience in explanation, the upstream-side and downstream-side protruding portions 145c are located at mutually the same phase; however, actually, the upstream-side and downstream-side protruding portions 145c are located at mutually shifted phases.

The upper and lower impellers 145, 146 are arranged so as to face each other with the positions in the axial direction aligned with each other, and the facing pairs of the upper and lower impellers 145, 146 are located at mutually shifted phases. In addition, the upper and lower impellers 145, 146 do not contact with each other during rotation of the upper and lower rotary shafts 21, 22.

With this configuration, the upper impellers 145 are able to move powder and solvent located between the upstream-side and downstream-side impellers 145 to another place with the use of the protruding portions 145c, and the lower impellers 146 are able to move powder and solvent located between the upstream-side and downstream-side impellers 146 to another place with the use of the protruding portions 146c. That is, the electrode paste production device 101 according to the second embodiment is able to prevent powder and solvent from stagnating between the upstream-side and downstream-side impellers 145 or between the upstream-side and downstream-side impellers 146.

Thus, the electrode paste production device 101 and the electrode paste production method according to the second embodiment are able to efficiently mix powder and solvent in the rough mixing zone 140 (rough mixing step), so it is possible to efficiently wet the powder.

Eight blade portions 147b of an upper impeller 147 shown in FIG. 11A and FIG. 11B are formed on the outer periphery of a corresponding shaft portion 147a at equally shifted phases with reference to the center of the shaft portion 147a. A radially outer end portion of each blade portion 147b of each upper impeller 147 protrudes radially outward of the upper rotary shaft 21 as a portion of the radially outer end portion progresses toward the downstream side (right side in FIG. 11B).

Eight blade portions 148b of a lower impeller 148 shown in FIG. 11A and FIG. 11B are formed on the outer periphery of a corresponding shaft portion 148a at equally shifted phases with reference to the center of the shaft portion 148a. A radially outer end portion of each blade portion 148b of each lower impeller 148 protrudes radially outward of the lower rotary shaft 22 as a portion of the radially outer end portion progresses toward the upstream side (left side in FIG. 11B).

In FIG. 11A and FIG. 11B, a kneading chamber 111 is formed such that the radii of two perfect circles when viewed in the transfer direction are larger than the radii of the perfect circles of the kneading chamber 11 shown in FIG. 8A and FIG. 8B. Accordingly, the protrusion size of the downstream end portion of each blade portion 147b and the protrusion size of the upstream end portion of each blade portion 148b are larger than the protrusion size of each blade portion 141b shown in FIG. 5A and FIG. 8B.

Figure 12:
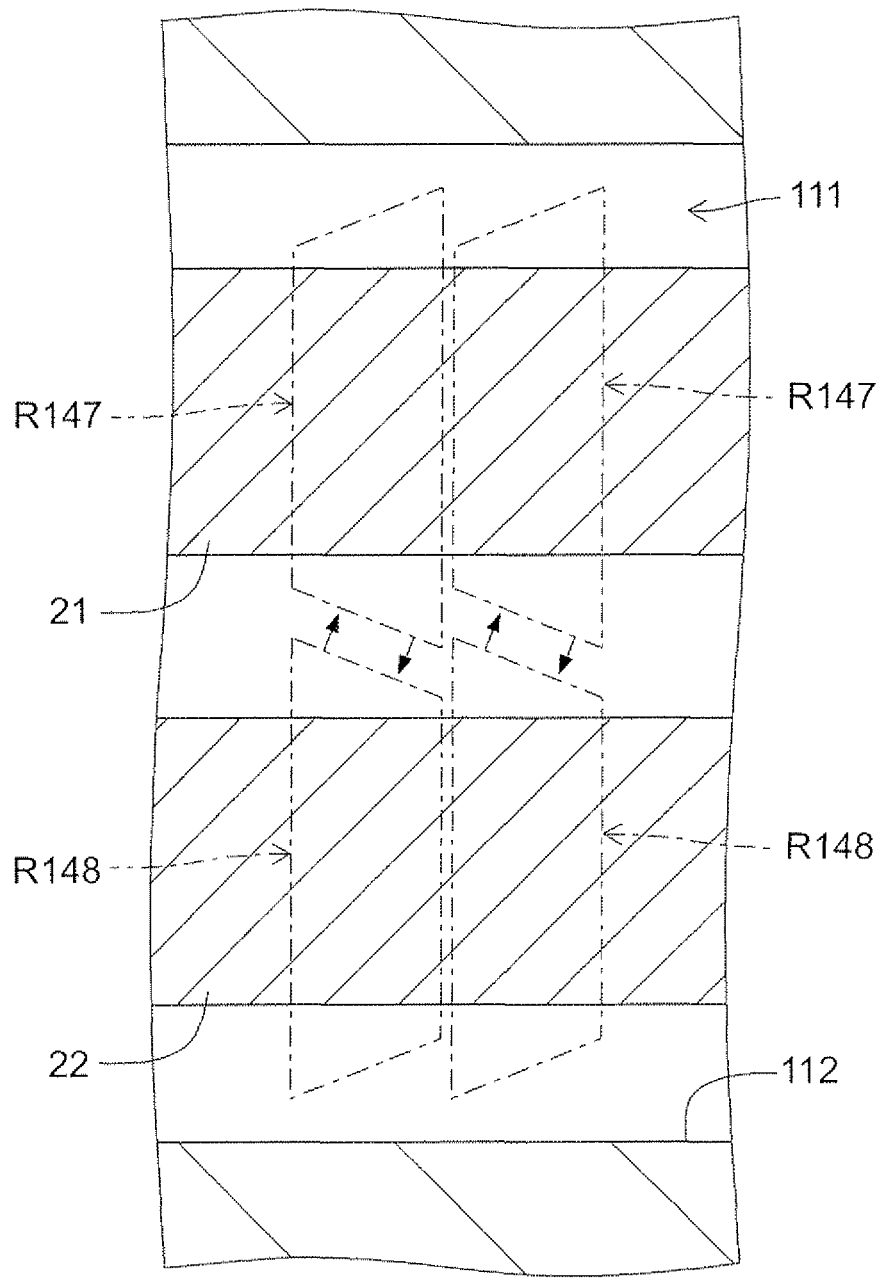
FIG. 12 is a view that shows rotational trajectories of the impellers of which each radially outer end portion protrudes radially outward along the transfer direction.

Thus, as shown in FIG. 11A, FIG. 11B and FIG. 12, a clearance is formed between the upper side of an inner wall 112 of a housing 110 and the downstream end portion of an outer periphery R147 of a rotational trajectory of each upper impeller 147. The length of the clearance along the radial direction of the upper rotary shaft 21 is about 5 mm as in the case of each 5 mm paddle 41 according to the first embodiment. In addition, a clearance is formed between the lower side of the inner wall 112 of the housing 110 and the upstream end portion of an outer periphery R148 of a rotational trajectory of each lower impeller 148. The length of the clearance along the radial direction of the lower rotary shaft 22 is about 5 mm as in the case of each 5 mm paddle 41 according to the first embodiment.

A clearance by which powder and solvent can be mixed (for example, about 7 mm) is formed between the upper side of the inner wall 112 of the housing 110 and the upstream end portion of the outer periphery R147 of the rotational trajectory of each impeller 147 and between the lower side of the inner wall 112 of the housing 110 and the downstream end portion of the outer periphery R148 of the rotational trajectory of each impeller 148.

The upper and lower impellers 147, 148 are arranged so as to face each other with the positions in the axial direction aligned with each other, and the facing, pairs of upper and lower impellers 147, 148 are arranged at the same phase. A somewhat large clearance is formed along the up-and-down direction between the outer peripheries R147, R148 of the rotational trajectories of the upper and lower impellers 147, 148. That is, the upper and lower impellers 147, 148 do not contact with each other during rotation of the upper and lower rotary shafts 21, 22.

The clearance between the outer peripheries R147, R148 of the rotational trajectories of the impellers 147, 148 is set to about 5 mm as in the case of the clearance between the inner wall 112 of the housing 110 and each of the outer peripheries R147, R148 of the rotational trajectories.

With this configuration, the upper and lower impellers 147, 148 each are able to increase the area of its rotational trajectory, and are able to increase the amount of powder and solvent moving between the upper and lower impellers 147, 148 (see arrows shown in FIG. 12).

Thus, the electrode paste production device 101 and the electrode paste production method according to the second embodiment are able to efficiently mix powder and solvent in the rough mixing zone 140 (rough mixing step), so it is possible to efficiently wet the powder.

In this way, the upper and lower impellers 141 to 148 are supported by the upper and lower rotary shafts 21, 22, and function as a rough mixing portion that mixes powder and solvent.

In the rough mixing zone 40, the clearance of about 5 mm does not always need to be formed between the inner wall 12 of the housing 10 and the outer periphery of the rotational trajectory of the rough mixing portion (the upper and lower 5 mm paddles 41, 42). In, the rough mixing zone 140, the clearance of about 5 mm does not always need to be formed between the inner wall 112 of the housing 110 and the outer periphery of the rotational trajectory of the rough mixing portion (the upper and lower impellers 141 to 148). That is, the rough mixing portion just needs to form a clearance between the inner wall 12 of the housing 10 and the outer periphery of the rotational trajectory or between the inner wall 112 of the housing 110 and the outer periphery of the rotational trajectory such that the clearance is so large that high shearing force is not applied to powder and the clearance is so small that powder and solvent can be mixed.

Specifically, the rough mixing portion just needs to form a clearance having a size of larger than or equal to 3 mm and smaller than or equal to 10 mm between the inner wall 12 of the housing 10 and the outer periphery of the rotational trajectory or between the inner wall 112 of the housing 110 and the outer periphery of the rotational trajectory. Thus, the electrode paste production device 1 is able to prevent the particles of the negative electrode active material from breaking or chipping in the rough mixing zone 40, and the electrode paste production device 101 is able to prevent the particles of the negative electrode active material from breaking or chipping in the rough mixing zone 140.

Next, the experimental results using the electrode paste production device 1 according to the first embodiment and the electrode paste production device 101 according to the second embodiment will be described.

In an experiment, as shown in FIG. 6 and FIG. 13, the electrode paste according to the first embodiment was produced by using the electrode paste production device 1 in which the six pairs of 5 mm paddles 41, 42 and the resistance paddles 63, 64 are provided in the rough mixing zone 40.

In the experiment, the electrode paste according to the second embodiment was produced by using the electrode paste production device 101 in which the two pairs of twisted impellers 143, 144 shown in FIG. 9A and FIG. 9B are provided in the rough mixing zone 140.

In the experiment, electrode paste was produced by using an electrode paste production device in which 1 mm paddles configured as in the case of the 1 mm paddles 61, 62 of the stiffening zone 60 are provided at a portion corresponding to the rough mixing zone 40 shown in FIG. 1 (that is, no rough mixing zone 40 is formed). Hereinafter, the electrode paste produced by using the electrode paste production device in which no rough mixing zone 40 is formed is referred to as "existing electrode paste".

In the stiffening zone field shown in FIG. 13, only the type of paddle provided on the upstream side of the stiffening zone 60 (the rough mixing zone 40 at a portion corresponding to the first embodiment) and the number of the paddles are written. That is, in the stiffening zone field shown in FIG. 13, the upper and lower resistance paddles 63, 64 provided at the downstream end portion of the stiffening zone 60 (the rough mixing zone 40 in the field according to the first embodiment) are not written.

In the experiment, the electrode pastes were produced by setting the rotation speed of each of the upper and lower rotary shafts 21, 22 to 600 rpm and adjusting an electrode paste production condition (for example, material injection speed, or the like) such that the average residence time of each electrode paste production device is equal to one another. The average residence time of each electrode paste production device is an average residence time from when powder and solvent are injected into the housing 10 to when the injected powder and solvent are discharged from the housing 10 as electrode paste.

In the experiment, the particle size distribution of each electrode paste and the particle size distribution of powder before being injected into the housing 10 were measured with the use of a microtrack. In the experiment, a D50 value was calculated as an index indicating the particle size distribution. The D50 value of powder before being injected into the housing 10 was 10.0 μm.

As shown in FIG. 13, the D50 value of the existing electrode paste was 9.3 μm. This is due to the fact that there occurred breaks or chips of the particles of the negative electrode active material in the kneading zone 50.

On the other hand, the D50 value of the electrode paste according to the first embodiment was 10.0 μm. That is, in the electrode paste according to the first embodiment, the D50 value did not change as compared to the D50 value of powder before being injected into the housing 10. The D50 value of the electrode paste according to the second embodiment was 9.9 μm. That is, in the electrode paste according to the second embodiment, the D50 value did not significantly change as compared to the D50 value of powder before being injected into the housing 10.

As described above, it appears that the electrode paste production device 1 according to the first embodiment and the electrode paste production device 101 according to the second embodiment are able to suppress breaks and chips of the particles of the negative electrode active material.

In addition, in the experiment, the viscosity of each electrode paste was measured with the use of a predetermined viscometer.

The viscosity of the electrode paste according to the first embodiment was 1100 mPa·s. On the other hand, the viscosity of the electrode paste according to the 1.5 second embodiment was 700 mPa·s.

Such a difference in viscosity occurs due to the fact that high shearing force was applied to the mixture by the four pairs of 1 mm paddles 61, 62 provided in the stiffening zone 60.

As described above, the electrode paste production device desirably applies high shearing force to the mixture by arranging a plurality of pairs of 1 mm paddles, and the like, in the stiffening zone. Thus, the electrode paste production device is able to decrease the viscosity of the electrode paste.

Next, an electrode paste production device 201 and an electrode paste production method according to a third embodiment will be described.

Figure 14:
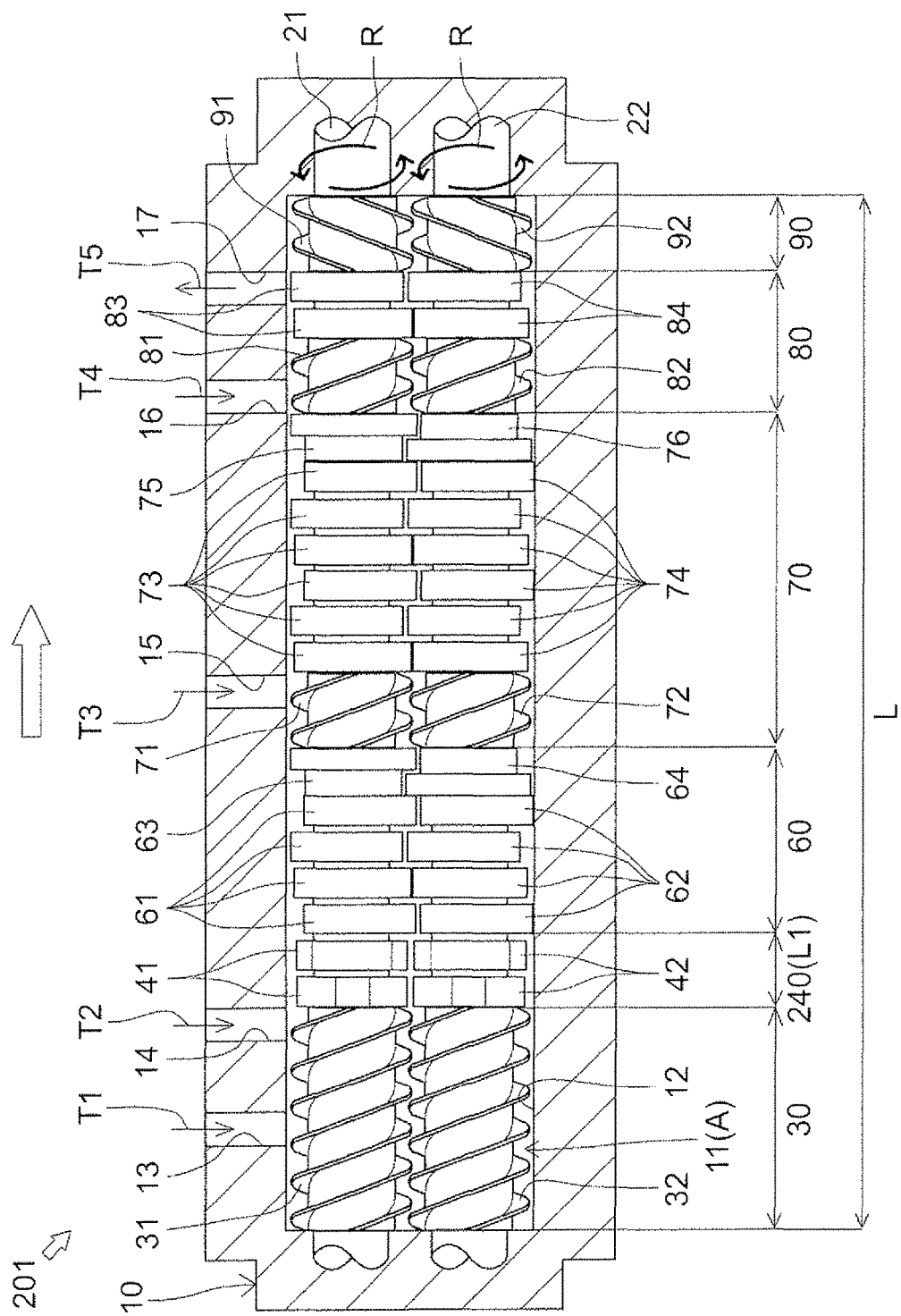
FIG. 14 is a view that illustrates the relationship between an electrode paste production device according to a third embodiment and a production condition of electrode paste.

As shown in FIG. 14, the electrode paste production device 201 according to the third embodiment is configured to set an electrode paste production condition such that the upper and lower rotary shafts 21, 22 are sufficiently rotated and then a mixture is transferred from a rough mixing zone 240 to the stiffening zone 60.

The electrode paste production device 201 according to the third embodiment is formed of the same members as those of the electrode paste production device 1 according to the first embodiment. Therefore, like reference numerals denote members corresponding to the members of the electrode paste production device 1 according to the first embodiment, other than the rough mixing zone 240, and the description thereof is omitted.

Hereinafter, the procedure of setting the electrode paste production condition will be described.

The electrode paste production device 201 according to the third embodiment sets the electrode paste production condition such that the accumulated number of revolutions R1 of each of the upper and lower rotary shafts 21, 22 is larger than or equal to 300 in the average residence time of the rough mixing zone 240. Hereinafter, the accumulated number of revolutions R1 of each of the upper and lower rotary shafts 21, 22 in the average residence time of the rough mixing zone 240 is referred to as the "accumulated number of revolutions R1 in the rough mixing zone 240".

First, the electrode paste production device 201 according to the third embodiment calculates an average residence time T (min) of the electrode paste production device 201 using the following mathematical expression (1) in order to set the accumulated number of revolutions R1 in the rough mixing zone 240.

$$T = C \times A/B \tag{1}$$

Here, C denotes a material filling rate (%), A denotes an effective volume (liter) in the housing, and B denotes a material injection speed (g/min). The average residence time T of the electrode paste production device 201 is an average residence time from when powder and solvent are injected into the housing 10 to when the injected powder and solvent are discharged from the housing 10 as electrode paste.

A constant value is set for the material filling rate C in advance when electrode paste is produced. The effective volume A in the housing is obtained by subtracting the volume of the upper and lower rotary shafts 21, 22 in the kneading chamber 11 and the volume of members (for example, the upper and lower feed screws 31, 32, the upper and lower 5 mm paddles 41, 42, and the like) supported by the upper and lower rotary shafts 21, 22 from the volume in the housing 10. The material injection speed B is obtained by multiplying the density of powder by the injecting volume velocity (liter/min).

The accumulated number of revolutions R1 in the rough mixing zone 240 is determined by the following mathematical expression (2) using the average residence time T of the electrode paste production device 201.

$$R1 = R \times T \times L1/L \tag{2}$$

Here, R denotes the rotation speed (rpm) of each of the upper and lower rotary shafts 21, 22, L1 denotes the length (mm) of the rough mixing zone 240 along the transfer direction, and L denotes the length (mm) from the injection zone 30 to the return zone 90 along the transfer direction.

Powder and solvent do not substantially stagnate at portions at which the screws 31, 32, 71, 72, 81, 82, 91, 92 are provided in the kneading chamber 11. Therefore, the length L and the length L1 each exclude the lengths of the screws 31, 32, 71, 72, 81, 82, 91, 92 along the transfer direction.

The electrode paste production device 201 according to the third embodiment sets the electrode paste production condition such that the accumulated number of revolutions R1 in the rough mixing zone 240, determined by the above mathematical expression (2), is larger than or equal to 300. That is, in the third embodiment, the electrode paste production condition includes the rotation speed R of each of the upper and lower rotary shafts 21, 22, the length L1 of the rough mixing zone 240 along the transfer direction, the length L from the injection zone 30 to the return zone 90 along the transfer direction, the effective volume A in the housing and the material injection speed B.

With this configuration, the electrode paste production device 201 and the electrode paste production method according to the third embodiment are able to prevent a mixture from being transferred to the stiffening zone 60 before powder is sufficiently wetted. That is, the electrode paste production device 201 and the electrode paste production method according to the third embodiment are able to sufficiently wet powder before high shearing force is applied to a mixture, so it is possible to suppress breaks and chips of the particles of the negative electrode active material.

The rotation speed R of each of the upper and lower rotary shafts 21, 22 is adjusted by, for example, controlling the drive devices connected to the upper and lower rotary shafts 21, 22.

The length L1 of the rough mixing zone 240 along the transfer direction is adjusted by, for example, changing the number of the pairs of upper and lower 5 mm paddles 41, 42 provided in the rough mixing zone 240.

The length L from the injection zone 30 to the return zone 90 along the transfer direction is adjusted by, for example, changing the internal shape of the housing 10.

The effective volume A in the housing is adjusted by, for example, changing the members supported by the upper and lower rotary shafts 21, 22 or changing the internal shape of the housing 10.

The material injection speed B is adjusted by, for example, controlling a device that is coupled to the powder injection port 13 of the housing 10 and that supplies powder.

Next, the experimental results using the electrode paste production device 201 according to the third embodiment will be described.

As shown in FIG. 15, in an experiment, by changing the number of the pairs of upper and lower 5 mm paddles 41, 42 provided in the rough mixing zone 240, the length L1 of the rough mixing zone 240 along the transfer direction, or the like, was adjusted, and the accumulated number of revolutions R1 in the rough mixing zone 240 was adjusted. In the experiment, the rough mixing zone 240 was formed separately in the following four cases, and the electrode paste according to the third embodiment was produced.

In Case 1, the six pairs of 5 mm paddles 41, 42 and the resistance paddles 63, 64 were provided in the rough mixing zone 240, the accumulated number of revolutions R1 in the rough mixing zone 240 was adjusted to 1800, and then the electrode paste was produced (see FIG. 6).

In Case 2, the three pairs of 5 mm paddles 41, 42 were provided in the rough mixing zone 240, the accumulated number of revolutions R1 in the rough mixing zone 240 was adjusted to 900, and then the electrode paste was produced.

In addition, in Case 2, the three pairs of 1 mm paddles 61, 62 and the resistance paddles 63, 64 were provided in the stiffening zone 60.

In Case 3, the two pairs of 5 mm paddles 41, 42 were provided in the rough mixing zone 240, the accumulated number of revolutions R1 in the rough mixing zone 240 was adjusted to 600, and then the electrode paste was produced (see FIG. 14). In addition, in Case 3, the four pairs of 1 mm paddles 61, 62 and the resistance paddles 63, 64 were provided in the stiffening zone 60.

In Case 4, the pair of 5 mm paddle 41, 42 were provided in the rough mixing zone 240, the accumulated number of revolutions R1 in the rough mixing zone 240 was adjusted to 300, and then the electrode paste was produced. In addition, in Case 4, the five pairs of 1 mm paddles 61, 62 and the resistance paddles 63, 64 were provided in the stiffening zone 60.

In the experiment, as in the case of the experiment for the electrode paste according to the first embodiment and the electrode paste according to the second embodiment, the existing electrode paste was produced by using the electrode paste production device in which no rough mixing zone is formed. That is, in the third embodiment, the existing electrode paste is electrode paste produced by adjusting the accumulated number of revolutions R1 in the rough mixing zone 240 to 0, and corresponds to a comparative example to the electrode paste according to the third embodiment.

In the stiffening zone field shown in FIG. 15, only the type of paddle provided on the upstream side of the stiffening zone 60 (the rough mixing zone 240 at a portion corresponding to Case 1) and the number of pairs of the paddles are written. That is, in the stiffening zone field shown in FIG. 15, the upper and lower resistance paddles 63, 64 provided at the downstream end portion of the stiffening zone 60 (the rough mixing zone 240 in the field according to Case 1) are not written.

In the experiment, the D50 value was calculated in accordance with the procedure similar to that of the experiment for the electrode paste according to the first embodiment and the electrode paste according to the second embodiment.

The D50 values of the electrode pastes according to Case 1 to Case 4 were 10.0 μm, 9.9 μm, 9.8 μm, 9.5 μm, respectively. On the other hand, the D50 value of the existing electrode paste was 9.3 μm.

That is, the D50 value of the electrode paste was close to the D50 value (10 μm) of powder before being injected into the housing 10 with an increase in the accumulated number of revolutions R1 in the rough mixing zone 240. In addition, it appears that the electrode paste production device 201 according to the third embodiment is able to suppress breaks and chips of the particles of the negative electrode active material by setting the accumulated number of revolutions R1 in the rough mixing zone 240 to 300 or larger.

In the electrode paste production device 201 according to the third embodiment, the rough mixing zone is formed by the upper and lower 5 mm paddles; however, the rough mixing zone is not limited to this configuration. That is, the electrode paste production device 201 according to the third embodiment may form the rough mixing zone using the impellers 141 to 148 according to the second embodiment (see FIG. 8A, FIG. 8B to FIG. 11A and FIG. 11B).

Next, an electrode paste production device 301 and an electrode paste production method according to a fourth embodiment will be described.

As shown in FIG. 7 and FIG. 16, the electrode paste production device 301 according to the fourth embodiment differs from the electrode paste production device 101 according to the second embodiment in that upper and lower return screws 343, 344 are provided at the downstream side of the rough mixing zone 340.

Therefore, in the following description, reference numerals denote members corresponding to the members of the electrode paste production device 101 according to the second embodiment, other than the rough mixing zone 340 and the upper and lower return screws 343, 344, and the description thereof is omitted.

The upper and lower return screws 343, 344 are configured similarly to the return screws 91, 92 of the return zone 90 except that the upper and lower return screws 343, 344 are arranged at the downstream side of the rough mixing zone 340 and the length along the transfer direction is short. The upper and lower return screws 343, 344 push back powder and solvent (mixture) with force weaker than force for transferring powder and solvent.

With this configuration, the electrode paste production device 301 according to the fourth embodiment is able to push back powder and solvent, which are mixed by rotating the upper and lower impellers 141, 142, by rotation of the upper and lower return screws 343, 344.

Thus, the electrode paste production device 301 and the electrode paste production method according to the fourth embodiment are able to prevent a mixture from being transferred to the stiffening zone 60 before powder is sufficiently wetted. That is, the electrode paste production device 301 and the electrode paste production method according to the fourth embodiment are able to sufficiently wet powder before high shearing force is applied to a mixture, so it is possible to suppress breaks and chips of the particles of the negative electrode active material.

In this way, the upper and lower return screws 343, 344 are supported by the upper and lower rotary shafts 21, 22 on the downstream side of the upper and lower impellers 141, 142, and function as a suppressing portion that suppresses a transfer of powder and solvent toward the downstream side by rotation.

In the rough mixing zone 340, a transfer of powder and solvent that are mixed with each other to the downstream side with respect to the upper and lower return screws 343, 344 just needs to be suppressed.

For example, when the two pairs of upper and lower impellers 141, 142 are provided in the rough mixing zone 340, the upper and lower return screws 343, 344 just need to be arranged between the pair of upstream-side impellers 141, 142 and the pair of downstream-side impellers 141, 142 or on the downstream side of the two pairs of upper and lower impellers 141, 142. That is, in the case where the two or more pairs of upper and lower impellers 141, 142 are provided in the rough mixing zone 340, the downstream side with respect to the pairs of upper and lower impellers 141, 142 means the downstream side of at least one pair of the upper and lower impellers 141, 142.

Next, the experimental results using the electrode paste production device 301 according to the fourth embodiment will be described.

In an experiment, the electrode paste according to the fourth embodiment was produced by using the above-described electrode paste production device 301 according to the fourth embodiment, that is, the electrode paste production device 301 configured as shown in FIG. 16.

As shown in FIG. 17, in the experiment, as in the case of the experiment for the electrode paste according to the first embodiment and the electrode paste according to the second embodiment, the existing electrode paste was produced by using the electrode paste production device in which no rough mixing zone is formed.

In the stiffening zone field shown in FIG. 17, only the type of paddle provided on the upstream side of the stiffening zone 60 and the number of the pairs of paddles are written. That is, in the stiffening zone field shown in FIG. 17, the upper and lower resistance paddles 63, 64 provided at the downstream end portion of the stiffening zone 60 are not written.

In the experiment, the D50 value was calculated in accordance with the procedure similar to that of the experiment for the electrode paste according to the first embodiment and the electrode paste according to the second embodiment.

The D50 value of the electrode paste according to the fourth embodiment was 10.0 µm. That is, in the electrode paste according to the fourth embodiment, the D50 value did not change as compared to the D50 value (10 µm) of powder before being injected into the housing 10.

As described above, it appears that the electrode paste production device 301 according to the fourth embodiment is able to suppress breaks and chips of the particles of the negative electrode active material.

Figure 18:
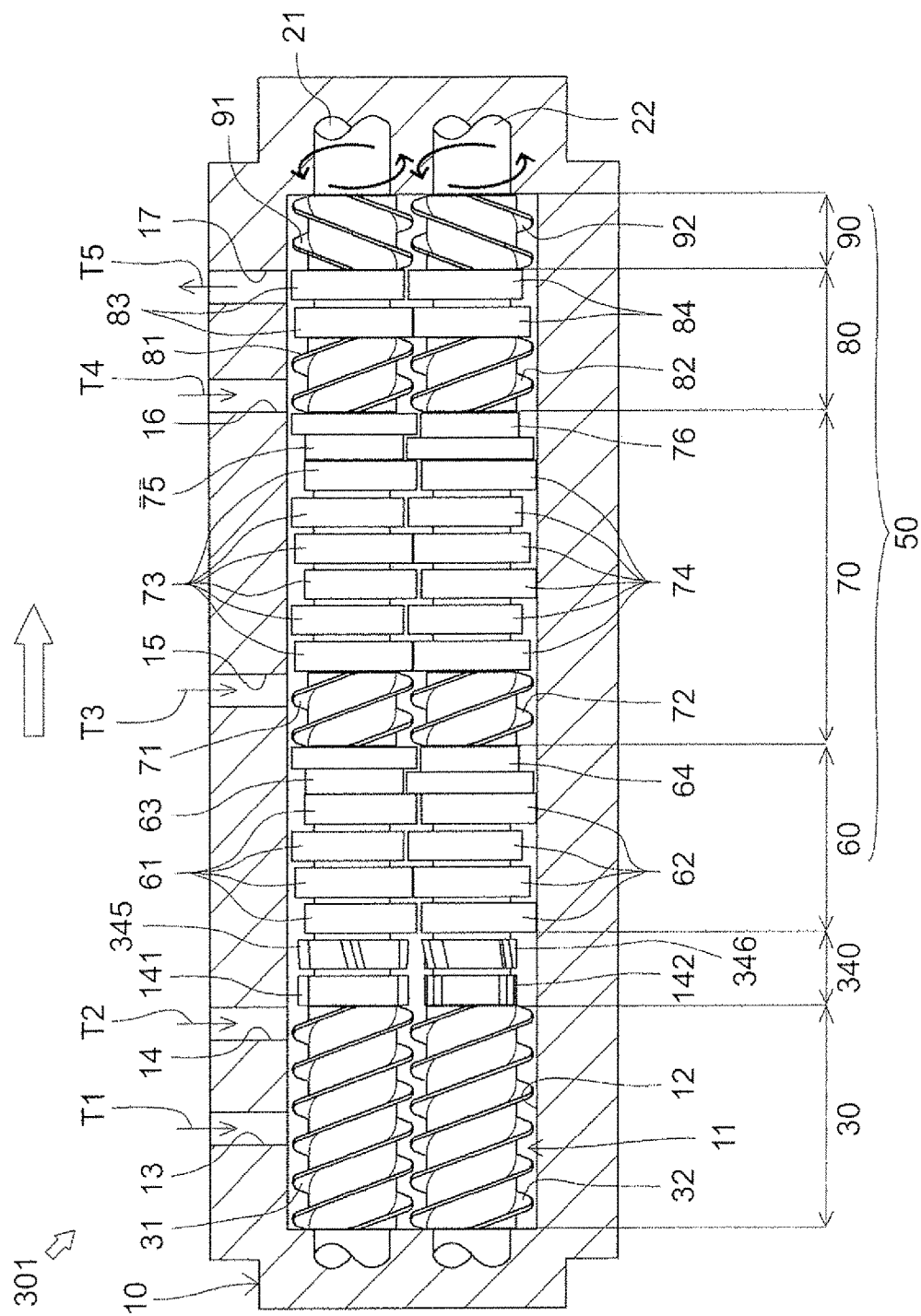
FIG. 18 is a partially cross-sectional view that shows the configuration of the electrode paste production device when twisted impellers are arranged in a rough mixing zone according to the fourth embodiment.
Figure 19:
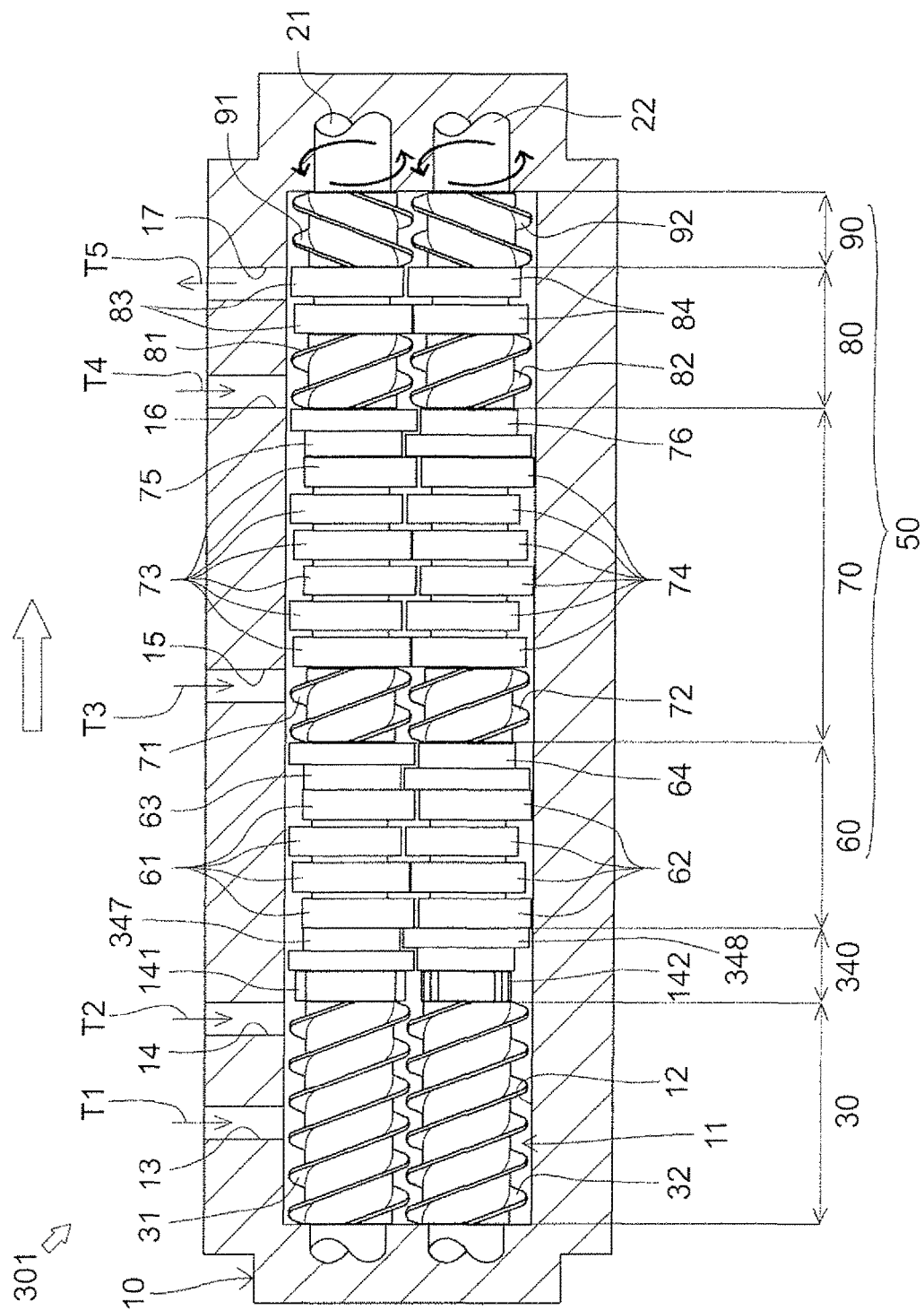
FIG. 19 is a partially cross-sectional view that shows the configuration of the electrode paste production device when resistance paddles are arranged in the rough mixing zone according to the fourth embodiment.

The suppressing portion provided in the rough mixing zone 340 is not necessarily the return screws 343, 344. For example, the suppressing portion may be twisted impellers 345, 346 (see FIG. 18), resistance paddles 347, 348 (see FIG. 19), or the like. The twisted impellers 345, 346 are able to push back powder and solver to the upstream side. The resistance paddles 347, 348 are configured similarly to the resistance paddles 63, 64 of the stiffening zone 60. In addition, the suppressing portion may be formed by any combination of the return screws 343, 344, the twisted impellers 345, 346 and the resistance paddles 347, 348.

If the resistance paddles 347, 348 are provided in the rough mixing zone 340, powder is hard to pass through the resistance paddles 347, 348 due to a minute clearance between the inner wall 12 of the housing 10 and each of the resistance paddles 347, 348 and a minute clearance between the resistance paddles 347, 348. Therefore, the electrode paste production device 301 according to the fourth embodiment is able to suppress a transfer of powder to the downstream side.

When the electrode paste production devices 1, 101, 201, 301 and the electrode paste production methods according to the first embodiment to the fourth embodiment produce electrode paste for a positive electrode as well, it is possible to prevent breaks and chips of the particles of a positive electrode active material as in the case of producing electrode paste for a negative electrode. Thus, the electrode paste production devices 1, 101, 201, 301 and the electrode paste production methods according to the first embodiment to the fourth embodiment are able to ensure the battery characteristic as designed when the electrode paste for a positive electrode is produced as well.

What is claimed is:

1. An electrode paste production device comprising:
   a hollow exterior component having a generally tubular configuration while maintaining the same interior cross section throughout its length, and including in said interior, in an axial direction, an injection zone, a rough mixing zone and a kneading zone, the rough mixing zone being located between the injection zone and the kneading zone;
   two rotary shafts, the rotation speed of which is controlled by a controller, said shafts located in said interior in an axial direction and extending through the injection zone, rough mixing zone and kneading zone of the exterior component in a state where the rotary shafts are located parallel to each other at a predetermined interval in a direction perpendicular to the axial direction;

the injection zone including a transfer portion in the form of a feed screw configured to transfer separately injected powder and solvent to a downstream side in a transfer direction by rotation of the two rotary shafts;

the rough mixing zone including a rough mixing portion configured to produce a mixture by mixing the powder and the solvent by rotation of the two rotary shafts without applying a shearing force, which is higher than or equal to a predetermined shearing force, to the powder; and the kneading zone including a kneading portion configured to produce electrode paste by kneading the mixture through application of a shearing force, which is higher than the shearing force that is applied in the rough mixing zone, to the mixture by rotation of the two rotary shafts, wherein each rotary shaft in the rough mixing portion includes an impeller having a shaft portion and blade portions provided on the outer periphery of the shaft portion radially outward of the rotary shaft, and configured to apply a shearing force to the mixture of the powder and the solvent, and each rotary shaft in the kneading portion includes a paddle configured to apply a higher shearing force to the mixture than the shearing force applied by the impellers of the rough mixing portion, and wherein a clearance between an outer periphery of a rotational trajectory of the impellers of the rough mixing portion and an inner wall of the housing is larger than a clearance between an outer periphery of a rotational trajectory of the paddles of the kneading portion and the inner wall of the housing.

2. The electrode paste production device according to claim 1, wherein
a clearance between an outer periphery of a rotational trajectory of the impellers in the rough mixing portion and an inner wall of the exterior component is larger than or equal to 3 mm and smaller than or equal to 10 mm.

3. The electrode paste production device according to claim 1, wherein
the rotational speed of the two rotating shafts is adjustable to cause an accumulated number of revolutions of each of the rotary shafts in an average residence time of the powder and the solvent in the rough mixing zone to be 300 or larger.

4. The electrode paste production device according to claim 1, further comprising:
a suppressing portion on a downstream side of the rough mixing portion in the transfer direction in the rough mixing zone, the suppressing portion being configured to suppress by rotation a transfer of the powder and the solvent to the downstream side in the transfer direction, wherein the rotary shafts are located as an upper rotary shaft and a lower rotary shaft, and the suppressing portion includes upper and lower screws supported by the upper and lower rotary shafts, respectively, and oriented in a direction opposite the transfer direction.

5. The electrode paste production device according to claim 1, wherein the transfer portion includes a powder injection port configured for powder injection and a solvent injection port located downstream of the powder injection port and configured for solvent injection.

6. The electrode paste production device according to claim 1, wherein the hollow exterior component has such a shape that two perfect circles partially overlap with each other when viewed in the transfer direction, and the rotary shafts are each located at the center of curvature of circular portions of the hollow exterior component.

* * * * *